United States Patent
Matsumoto et al.

(10) Patent No.: US 10,530,287 B2
(45) Date of Patent: Jan. 7, 2020

(54) ELECTRIC POWER ADJUSTMENT SYSTEM AND CONTROL METHOD FOR ELECTRIC POWER ADJUSTMENT SYSTEM

(71) Applicant: NISSAN MOTOR CO., LTD., Yokohama-shi, Kanagawa (JP)

(72) Inventors: Michihiko Matsumoto, Kanagawa (JP); Hideo Yoshida, Kanagawa (JP); Tetsuya Aoki, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 71 days.

(21) Appl. No.: 15/555,204

(22) PCT Filed: Mar. 6, 2015

(86) PCT No.: PCT/JP2015/056730
§ 371 (c)(1),
(2) Date: Sep. 1, 2017

(87) PCT Pub. No.: WO2016/143012
PCT Pub. Date: Sep. 15, 2016

(65) Prior Publication Data
US 2018/0054151 A1    Feb. 22, 2018

(51) Int. Cl.
*H02P 27/08* (2006.01)
*H01M 8/04858* (2016.01)

(52) U.S. Cl.
CPC ........ *H02P 27/08* (2013.01); *H01M 8/04865* (2013.01); *H01M 2250/20* (2013.01)

(58) Field of Classification Search
CPC ............ H02P 27/08; B60L 15/02; H02M 1/15

USPC .......................................................... 318/139
See application file for complete search history.

(56) References Cited

U.S. PATENT DOCUMENTS

| | | | |
|---|---|---|---|
| 8,790,838 B2 | 7/2014 | Hasegawa et al. | |
| 8,916,764 B2 * | 12/2014 | Weir | H02M 1/143 |
| | | | 136/244 |
| 9,450,261 B2 * | 9/2016 | Hasegawa | B60L 11/1887 |
| 9,515,575 B2 * | 12/2016 | Narita | H02M 7/53871 |
| 9,727,066 B2 * | 8/2017 | Manabe | H02M 3/1584 |
| 9,902,286 B2 * | 2/2018 | Imanishi | H02M 1/44 |
| 2005/0287402 A1 | 12/2005 | Maly et al. | |
| 2006/0284487 A1 | 12/2006 | Tang et al. | |

(Continued)

FOREIGN PATENT DOCUMENTS

| | | |
|---|---|---|
| CN | 101953009 A | 1/2011 |
| JP | 2007-012418 A | 1/2007 |

(Continued)

*Primary Examiner* — Kawing Chan
(74) *Attorney, Agent, or Firm* — Foley & Lardner LLP

(57) ABSTRACT

An electric power adjustment system includes a fuel cell connected to a load, and a multi-phase converter connected between the fuel cell and the load. The multi-phase converter is constituted of a plurality of phases and converts an output voltage from the fuel cell by a predetermined required voltage ratio. The electric power adjustment system includes a ripple current characteristic switching unit configured to switch a ripple current characteristic with respect to an input current to the multi-phase converter by changing at least one of a drive phase number and the voltage ratio of the multi-phase converter according to an operation state of the fuel cell and a required electric power of the load.

11 Claims, 19 Drawing Sheets

(56) References Cited

U.S. PATENT DOCUMENTS

| | | | |
|---|---|---|---|
| 2009/0117427 A1 | 5/2009 | Manabe et al. | |
| 2010/0266922 A1 | 10/2010 | Hasegawa et al. | |
| 2011/0193408 A1* | 8/2011 | Fuma | H02M 3/1584 |
| | | | 307/9.1 |
| 2012/0256571 A1* | 10/2012 | Ang | B60L 11/1803 |
| | | | 318/400.3 |
| 2012/0319478 A1* | 12/2012 | Gentchev | H02M 1/14 |
| | | | 307/28 |
| 2014/0152089 A1 | 6/2014 | Manabe et al. | |
| 2015/0091481 A1* | 4/2015 | Tago | H02P 6/28 |
| | | | 318/400.2 |
| 2017/0011842 A1* | 1/2017 | Ishigaki | H01F 3/14 |
| 2017/0244336 A1* | 8/2017 | Kitamoto | B60L 11/18 |

FOREIGN PATENT DOCUMENTS

| | | |
|---|---|---|
| JP | 2011-109815 A | 6/2011 |
| JP | 2011-109869 A | 6/2011 |
| JP | 2011-166990 A | 8/2011 |
| JP | 5143665 B2 | 2/2013 |
| JP | 2014-042410 A | 3/2014 |
| WO | WO 2013/005295 A1 | 10/2013 |

\* cited by examiner

ELECTRIC POWER ADJUSTMENT SYSTEM AND CONTROL METHOD FOR ELECTRIC POWER ADJUSTMENT SYSTEM

TECHNICAL FIELD

The present invention relates to an electric power adjustment system that switches ripple current characteristics by switching at least one of the number of drive phases and a voltage ratio of a multi-phase converter and a control method for the electric power adjustment system.

BACKGROUND ART

Among electric power adjustment systems that include a fuel cell, there is known an electric power adjustment system that is configured to supply an output power of the fuel cell to a load by supplying a fuel gas (such as hydrogen) and an oxidant gas (such as air) to the fuel cell in response to a request from the load that is connected to the fuel cell.

In the electric power adjustment system as described above, in order to control an operation state of the fuel cell, a wet/dry state (a wetness degree) of the fuel cell is estimated on the basis of an alternating-current component in an output current and an output voltage from the fuel cell that has a correlation relationship with the wet/dry state of the fuel cell, that is, an internal impedance of the fuel cell.

In the case where a ripple current included in the alternating-current component in the output current from the fuel cell is large when the wetness degree of a fuel cell stack is estimated on the basis of thus measured internal impedance, the wetness degree of the fuel cell cannot be accurately estimated, thereby causing difficulty in appropriately controlling the operation of the fuel cell.

Here, JP5143665B discloses an electric power adjustment system that includes a fuel cell and an electric storage device connected to a load in parallel, a first DC/DC converter disposed between the fuel cell and the load, and a second DC/DC converter disposed between the electric storage device and the load.

In this electric power adjustment system, according to a required electric power to the system, a transformation ratio of the first DC/DC converter is changed on the basis of a detection value of an output current from the electric storage device or a transformation ratio of the second DC/DC converter is changed on the basis of a detection value of an output current from the fuel cell. With this electric power adjustment system, controlling the transformation ratio of one of the two DC/DC converters ensures controlling a passing current of the other.

SUMMARY OF INVENTION

With the above-described electric power adjustment system, since the first DC/DC converter is disposed at a voltage output terminal of the fuel cell, the larger a voltage ratio (output voltage/input voltage), which is the transformation ratio, of the first DC/DC converter becomes, the more a ripple current component in an input current that flows from the fuel cell into the first DC/DC converter increases.

Here, in order to restrain this ripple current component, disposing a condenser with a large capacity to smooth the output voltage between the output terminals of the fuel cell can be considered. However, such large capacity condenser is expensive. Therefore, disposing the large capacity condenser for smoothing voltage has a problem of increasing a manufacturing cost of the electric power adjustment system including the fuel cell.

In contrast, when the large capacity condenser for smoothing voltage is not disposed, the ripple current component increases as the voltage ratio of the converter becomes large. This affects the detection value of the output current from the fuel cell. In this case, there is also a problem that the internal impedance of the fuel cell cannot be accurately calculated. The internal impedance of the fuel cell is calculated by detecting a slight alternating-current component in the output current and the output voltage from the fuel cell. Depending on a case, there is also a problem that the internal impedance of the fuel cell cannot be normally detected due to a detection value of an impedance detector (an impedance detection circuit) being saturated.

The present invention has been made in view of the above-described problems, and it is an object of the present invention to provide an electric power adjustment system that is configured to reduce a ripple current component generated in a fuel cell by switching the number of drive phases of converters that correspond to respective phases of a multi-phase converter and a voltage ratio controlled by the multi-phase converter, and a control method for the electric power adjustment system.

According to one aspect of the present invention, an electric power adjustment system includes a fuel cell connected to a load, and a multi-phase converter connected between the fuel cell and the load. The multi-phase converter is constituted of a plurality of phases and converts an output voltage from the fuel cell by a predetermined required voltage ratio. The electric power adjustment system includes a ripple current characteristic switching unit configured to switch a ripple current characteristic with respect to an input current to the multi-phase converter by changing at least one of a drive phase number and the voltage ratio of the multi-phase converter according to an operation state of the fuel cell and a required electric power of the load.

DESCRIPTION OF EMBODIMENTS

The following describes embodiments of the present invention with reference to the attached drawings.

(First Embodiment)

Figure 1:
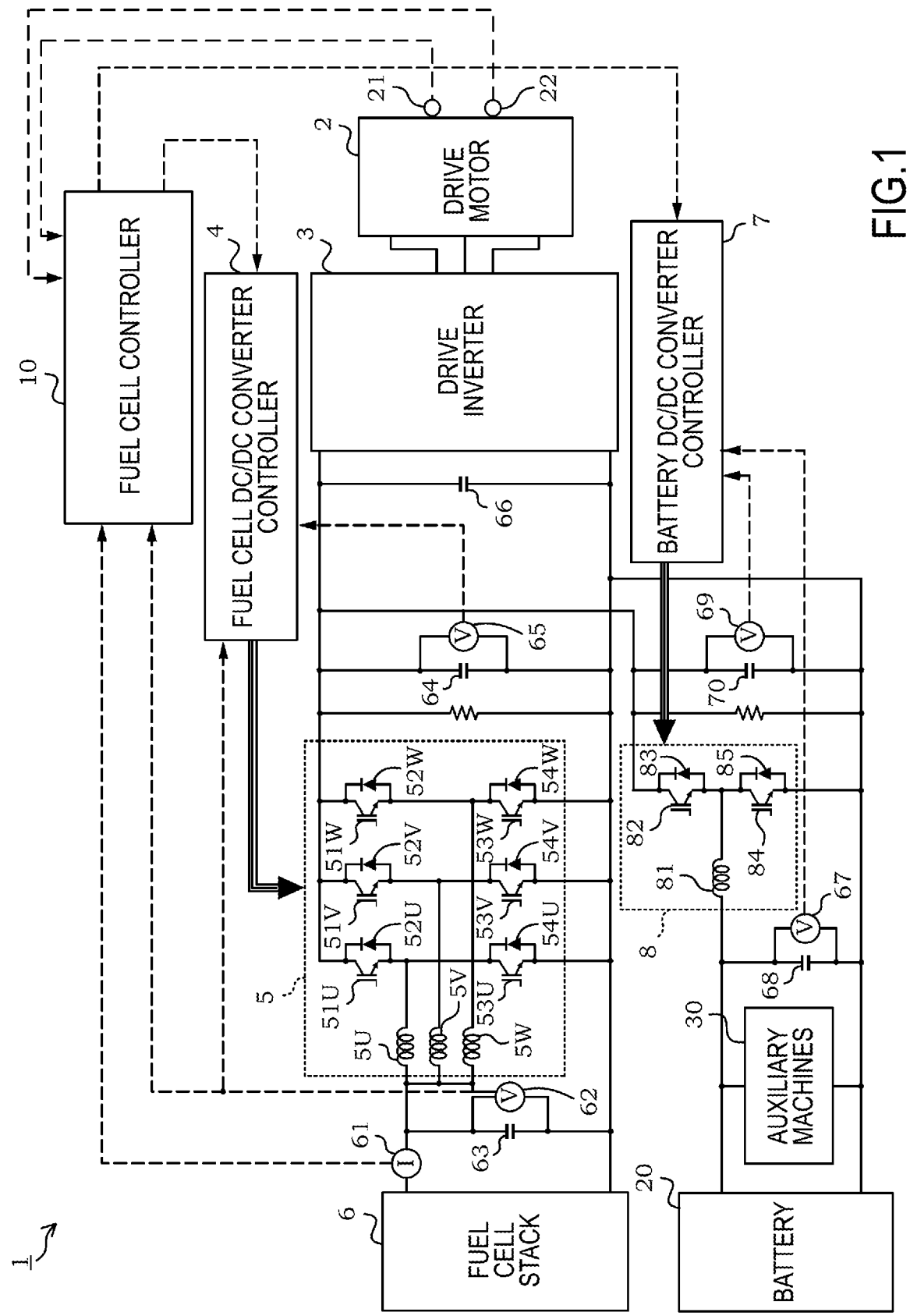
FIG. 1 is a drawing illustrating an overall configuration of an electric power adjustment system for a fuel cell according to a first embodiment of the present invention.

FIG. 1 is a drawing illustrating an overall configuration of an electric power adjustment system 1 for a fuel cell (hereinafter simply referred to as the "electric power adjustment system 1") according to a first embodiment of the present invention. The electric power adjustment system 1 of the present invention is one that is used for a vehicle that at least uses the fuel cell as a driving source. This electric power adjustment system 1 is mounted on, for example, an electric vehicle that drives the vehicle using a drive motor 2 as illustrated in FIG. 1. It should be noted that this electric power adjustment system 1 is applicable to a load in, for example, a device other than a fuel cell vehicle (an electric vehicle using the fuel cell) as long as the device uses the fuel cell as the driving source.

As illustrated in FIG. 1, the electric power adjustment system 1 of this embodiment includes a fuel cell stack 6, a DC/DC converter 5 for the fuel cell stack 6, a high-voltage battery 20 (hereinafter simply referred to as the "battery 20"), auxiliary machines 30, and a DC/DC converter 8 for the battery 20. The electric power adjustment system 1 includes a fuel cell controller 10 that controls the whole electric power adjustment system 1 including the fuel cell stack 6, a fuel cell DC/DC converter controller 4 that controls the DC/DC converter 5, a battery DC/DC converter controller 7 that controls the DC/DC converter 8. Furthermore, the electric power adjustment system 1 includes the drive motor 2 as a load and a drive inverter 3 that controls a DC power that is input from the fuel cell stack 6 and the battery 20 to be switched into an AC power to the drive motor 2.

The DC/DC converter 5 for the fuel cell stack 6 is disposed between the fuel cell stack 6 and the drive inverter 3 (the drive motor 2). This DC/DC converter 5 is to convert an output voltage from the fuel cell stack 6 into an input voltage to the drive inverter 3. In this embodiment, the DC/DC converter 5 is a step-up converter to step up the output voltage from the fuel cell stack 6 to a voltage appropriate for a driving voltage of the drive motor 2.

In this embodiment, the DC/DC converter 5 is constituted of three phases of converters. In view of this, this DC/DC converter 5 may be referred to as a multi-phase converter 5 in the following. It should be noted that the number of phases of the multi-phase converter 5 may be three or more phases.

The multi-phase converter 5 is constituted of three converters of a U-phase converter, a V-phase converter, and a W-phase converter, as illustrated in FIG. 1. The U-phase, V-phase, and W-phase converters are connected to three reactors 5U, 5V, and 5W, respectively. It should be noted that the U-phase converter, the V-phase converter, and the W-phase converter have similar configurations. Therefore, the following describes the configuration using the U-phase converter as a representative.

The U-phase converter includes the reactor 5U, a switching element 51U on a step-down side, a rectifier diode 52U, a switching element 53U on a step-up side, and a reflux diode 54U. The switching element 51U is inversely and parallelly connected to the rectifier diode 52U, and the switching element 53U is inversely and parallelly connected to the reflux diode 54U. These switching elements 51U and 53U are constituted of, for example, Insulated Gate Bipolar Transistors (IGBT).

The reactor 5U has one end connected to an output terminal on a positive electrode side of the fuel cell stack 6 via an electric current sensor 61 and the other end connected to one end between the switching element 51U and the rectifier diode 52U and one end between the switching element 53U and the reflux diode 54U. The other end between the switching element 51U and the rectifier diode 52U is connected to an input terminal on a positive electrode side of the drive inverter 3. The other end between the switching element 53U and the reflux diode 54U is connected to an output terminal on a negative electrode side of the fuel cell stack 6 and an input terminal on a negative electrode side of the drive inverter 3.

In this embodiment, the multi-phase converter 5 is configured to switch the number of drive phases (the number of drive phases of the multi-phase converter) by a control of the fuel cell DC/DC converter controller 4 on the basis of a relationship between a motor lower limit voltage of the drive motor 2 and the output voltage from the fuel cell stack 6, presence/absence of an impedance calculation request, and a ripple current amplitude with respect to a voltage ratio required to the multi-phase converter 5, as described later.

Between the output terminals of the fuel cell stack 6, a voltage sensor 62 for detecting the output voltage from the fuel cell stack 6 and a condenser 63 for smoothing the output voltage from the fuel cell stack 6 are connected in parallel. In this embodiment, the condenser 63 is a low-priced condenser with a small capacity instead of an expensive condenser with a large capacity for reducing the ripple current.

Between output terminals of the multi-phase converter 5, a condenser 64 for smoothing an output voltage from the multi-phase converter 5 and a voltage sensor 65 for detecting the output voltage from the multi-phase converter 5 (the input voltage to the drive inverter 3) are connected in parallel.

Furthermore, between a connecting terminal between the output terminal of the multi-phase converter 5 and an output terminal of the DC/DC converter 8 and the input terminal of the drive inverter 3, a condenser 66 for smoothing the input voltage to the drive inverter 3 is disposed.

The fuel cell stack 6 is connected to the drive motor 2 as the load of the electric power adjustment system 1 via the multi-phase converter 5 and the drive inverter 3. The fuel cell stack 6 is a lamination cell that generates electricity according to an electrical load, such as the drive motor 2, by receiving a supply of a cathode gas (an oxidant gas) and an anode gas (a fuel gas) from a cathode gas supplying/discharging device and an anode gas supplying/discharging device, which are not illustrated. The fuel cell stack 6 includes, for example, hundreds of layered fuel cells.

Many devices are connected to the fuel cell stack 6, including a supplying/discharging passage of the anode gas and a supplying/discharging passage of the cathode gas, pressure control valves disposed in each of the passages, a cooling water circulating passage and a cooling water pump, a radiator, and a cooling system for the fuel cell stack 6. However, these devices have little relationship with the technical feature of the present invention, thus omitting them from the illustrations.

The drive motor 2 is to drive the vehicle on which the electric power adjustment system 1 of this embodiment is mounted. The drive inverter 3 is to convert the DC power supplied from the fuel cell stack 6 and the battery 20 into the AC power and supply the converted AC power to the drive motor 2. The drive motor 2 is rotatably driven by the AC power supplied from the drive inverter 3 and supplies the rotational energy to a latter part. While the illustration is omitted, it should be noted that the drive motor 2 is linked to a driving wheel of the vehicle via a differential gear and a shaft.

When the vehicle is travelling downhill or decelerating, depending on a charging state of the battery 20, a regenerative electric power of the drive motor 2 is supplied to the battery 20 via the drive inverter 3 and the DC/DC converter 8, and thus the battery 20 is charged. When the vehicle is in power running, the drive motor 2 is rotated by electric power generated in the fuel cell stack 6 and stored electric power from the battery 20, and the rotational energy is transmitted to the driving wheel of the vehicle (not illustrated).

At proximity of the drive motor 2, a motor rotation speed detector 21 that detects a motor rotation speed of the drive motor 2 and a motor torque detector 22 that detects a motor torque of the drive motor 2 are disposed. The motor rotation speed and the motor torque of the drive motor 2 detected by these detectors 21 and 22 are output to the fuel cell controller 10.

The battery 20 is a chargeable/dischargeable secondary battery and is, for example, a 300 V (volt) lithium ion battery. The battery 20 is connected to the auxiliary machines 30 and constitutes a power source for the auxiliary machines 30. The battery 20 is connected to the drive inverter 3 and the DC/DC converter 5 via the DC/DC converter 8. That is, the battery 20 is connected to the drive motor 2, which is the load of the electric power adjustment system 1, in parallel with the fuel cell stack 6.

Output terminals of the battery 20 are connected to a voltage sensor 67 for detecting an output voltage from the battery 20 and a condenser 68 for smoothing the output voltage from the battery 20 in parallel with the auxiliary machines 30.

The DC/DC converter 8 for the battery 20 is a single-phase converter unlike the multi-phase converter 5 for the fuel cell stack 6. This DC/DC converter 8 includes a reactor 81, a switching element 82 on a step-down side, a rectifier diode 83, a switching element 84 on a step-up side, and a reflux diode 85, as illustrated in FIG. 1. The switching element 82 is inversely and parallelly connected to the rectifier diode 83 and the switching element 84 is inversely and parallelly connected to the reflux diode 85. These switching element s 82 and 84 are constituted, for example, of the IGBT.

The reactor 81 has one end connected to the output terminal on a positive electrode side of the battery 20 and the other end connected to one end between the switching element 82 and the rectifier diode 83 and one end between the switching element 84 and the reflux diode 85. The other end between the switching element 82 and the rectifier diode 83 is connected to the input terminal on the positive electrode side of the drive inverter 3. The other end between the switching element 84 and the reflux diode 85 is connected to the output terminal on a negative electrode side of the battery 20 and the input terminal on the negative electrode side of the drive inverter 3.

The output terminals of the DC/DC converter 8 are connected to a condenser 70 for smoothing an output voltage from the DC/DC converter 8 and a voltage sensor 69 for detecting the output voltage from the DC/DC converter 8 (the input voltage to the drive inverter 3).

The auxiliary machines 30 are components attached mainly to the fuel cell stack 6. The auxiliary machines 30 include the cathode gas supplying/discharging device and the anode gas supplying/discharging device as described above and an air compressor, a cooling pump, and similar component, which are not illustrated. It should be noted that when the various components of the auxiliary machines 30 are light electrical appliances, it is only necessary to dispose a step-down DC/DC converter (not illustrated) between the battery 20 and the object auxiliary machine 30.

While the illustration is omitted, the fuel cell controller 10 is constituted of a microcomputer including a central processing unit (CPU), a read-only memory (ROM), a random access memory (RAM), and an input/output interface (I/O interface). An output current value and an output voltage value from the fuel cell stack 6, which are detected by the electric current sensor 61 and the voltage sensor 62, are input to the fuel cell controller 10.

The fuel cell controller 10 outputs respective commands to operate the multi-phase converter 5 and the DC/DC converter 8 to the fuel cell DC/DC converter controller 4 and the battery DC/DC converter controller 7 on the basis of the output current value and the output voltage value from the fuel cell stack 6 that are input from the respective sensors 61 and 62 and the motor rotation speed and the motor torque of the drive motor 2 that are input from the respective detectors 21 and 22.

The fuel cell DC/DC converter controller 4 is to control the multi-phase converter 5 on the basis of the command from the fuel cell controller 10. Specifically, the fuel cell DC/DC converter controller 4, in this embodiment, switches the number of drive phases of the multi-phase converter 5 on the basis of the command from the fuel cell controller 10 and shifts phases of the input voltages to the converters of respective phases by 360 degrees/the number of drive phases according to this number of drive phases. For example, when two phases, the U-phase converter and the V-phase converter, are driven, the input voltages to the two converters are shifted by 180 degrees (=360 degrees/two phases). When three phases are driven, the input voltages to the three converters are each shifted by 120 degrees (=360 degrees/three phases).

The output voltage value from the fuel cell stack 6 detected by the voltage sensor 62 and an output voltage value from the multi-phase converter 5 detected by the voltage sensor 65 are input to the fuel cell DC/DC converter controller 4. The fuel cell DC/DC converter controller 4 switching-controls each of the switching elements of the multi-phase converter 5 such that a voltage ratio (output voltage/input voltage) of the multi-phase converter 5 becomes a command value from the fuel cell controller 10.

The battery DC/DC converter controller 7 is to control the DC/DC converter 8 for the battery 20 on the basis of the command from the fuel cell controller 10. The fuel cell DC/DC converter controller 4 and the battery DC/DC converter controller 7 control the voltage ratio of the multi-phase converter 5 and a voltage ratio of the DC/DC converter 8, respectively, such that the input voltages to the drive inverter 3 become identical.

An output voltage value from the battery 20 detected by the voltage sensor 67 and an output voltage value from the DC/DC converter 8 detected by the voltage sensor 69 are input to the battery DC/DC converter controller 7. The battery DC/DC converter controller 7 switching-controls each of the switching elements of the DC/DC converter 8 such that a voltage ratio (output voltage/input voltage) of the DC/DC converter 8 becomes a command value from the fuel cell controller 10.

Figure 2:
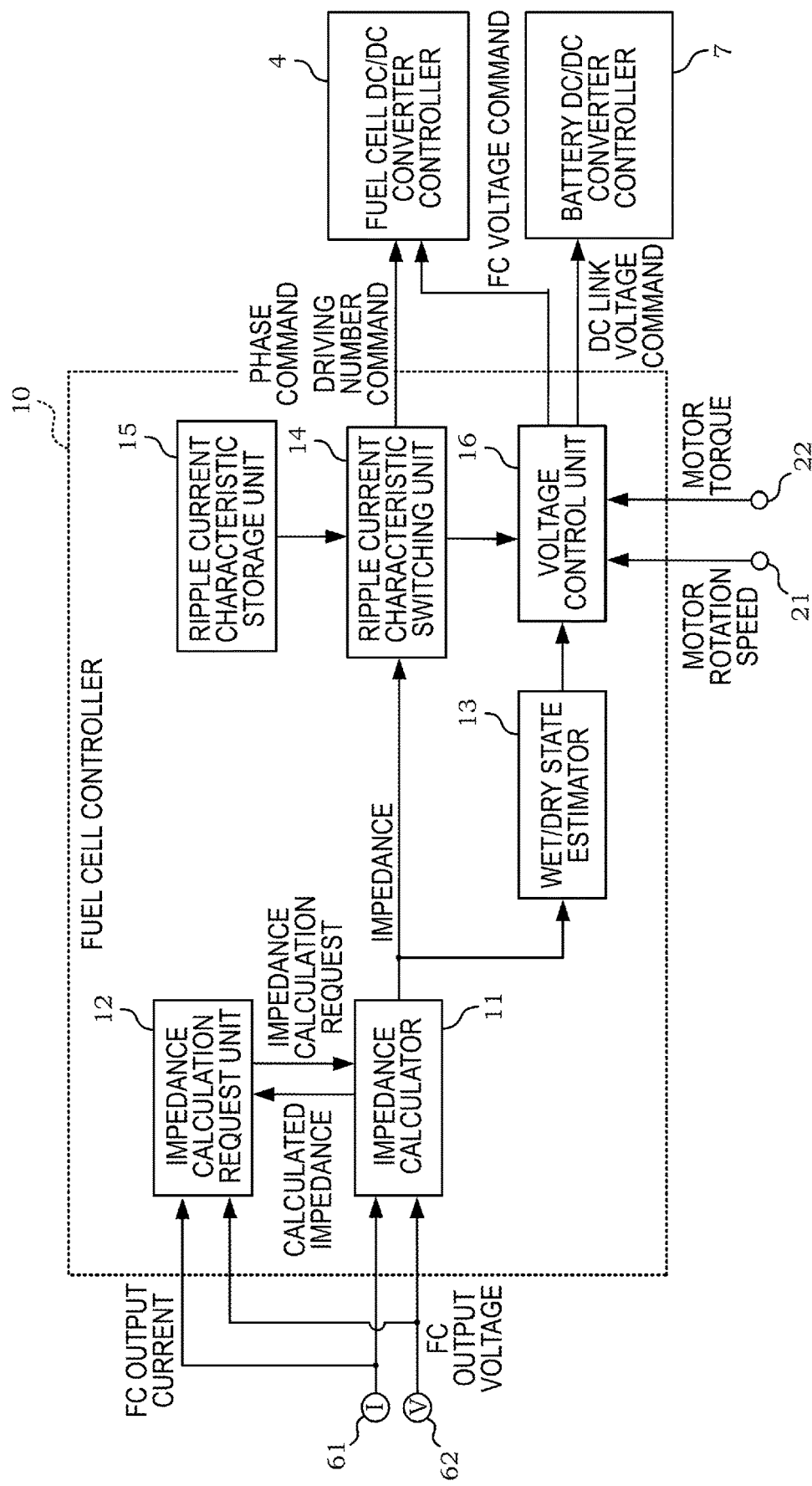
FIG. 2 is a block diagram illustrating a functional configuration of a fuel cell controller in FIG. 1.

FIG. 2 is a block diagram illustrating a functional configuration of the fuel cell controller 10 illustrated in FIG. 1. As illustrated in FIG. 2, the fuel cell controller 10 of this embodiment includes an impedance calculator 11, an impedance calculation request unit 12, a wet/dry state estimator 13, a ripple current characteristic switching unit 14, a ripple current characteristic storage unit 15, and a voltage control unit 16.

After receiving an impedance calculation request for the fuel cell stack 6 required by the impedance calculation request unit 12, the impedance calculator 11 calculates an impedance (an internal impedance) of the fuel cell stack 6 on the basis of an alternating-current component in the output current from the fuel cell stack 6 detected by the electric current sensor 61 and an alternating-current component in the output voltage of the fuel cell stack 6 detected by the voltage sensor 62.

Here, the calculated impedance of the fuel cell stack 6 has a correlation relationship with a wetness degree of the fuel cell stack 6 at the time point where the output current and the output voltage from the fuel cell stack 6 are detected. That is, the higher the impedance of the fuel cell stack 6 is, the closer the fuel cell stack 6 is to a state of overdry. On the other hand, the lower the impedance of the fuel cell stack 6 is, the closer the fuel cell stack 6 is to a state of overwet.

The impedance calculation request unit 12 determines whether the impedance of the fuel cell stack 6 is detectable or not on the basis of the alternating-current component in the output current from the fuel cell stack 6 detected by the electric current sensor 61, the alternating-current component in the output voltage of the fuel cell stack 6 detected by the voltage sensor 62, and the previous impedance value previously calculated by the impedance calculator 11.

That is, the impedance calculation request unit 12 determines whether a detection value (a calculation value of the impedance calculator 11) by an impedance detector (an impedance detection circuit) is in a saturated state or not on the basis of the detected output current value and output voltage value from the fuel cell stack 6 and the previous impedance value. Then, in the case where it is determined that the detection value is in the saturated state and the impedance of the fuel cell stack 6 is undetectable, the impedance calculation request unit 12 outputs a command to calculate the impedance of the fuel cell stack 6 again, namely, the impedance calculation request to the impedance calculator 11.

The impedance calculation request unit 12 determines whether power generation efficiency of the fuel cell stack 6 is lowered or not, that is, whether the fuel cell stack 6 is in a faulty state in generating power or not, on the basis of an estimated value of the wet/dry state of the fuel cell stack 6 estimated by the wet/dry state estimator 13. Then, in the case where it is determined that the power generation efficiency of the fuel cell stack 6 is lowered, the impedance calculation request unit 12 outputs the impedance calculation request for the fuel cell stack 6 to the impedance calculator 11.

The wet/dry state estimator 13 estimates the wet/dry state of the fuel cell stack 6 on the basis of the impedance of the fuel cell stack 6 calculated by the impedance calculator 11. Thus estimated wet/dry state of the fuel cell stack 6 is used for controlling the operation of the fuel cell stack 6. It should be noted that the operation control for the fuel cell stack 6 may be executed by a known control method according to the operation state. Accordingly, the control method for the fuel cell stack 6 is not described in details in this description.

The estimated wet/dry state of the fuel cell stack 6 is output to the voltage control unit 16 for a step-up control of the output voltage from the fuel cell stack 6 and a DC link control (control for linking (synchronizing) the output voltage from the DC/DC converter 5 and the output voltage from the DC/DC converter 8) of the output voltage from the battery 20.

In the operating state of the fuel cell stack 6 whose impedance of the fuel cell stack 6 has not been calculated, the wet/dry state estimator 13 estimates the wet/dry state of the fuel cell stack 6 on the basis of a past impedance calculation value and the operating state of the fuel cell stack 6. In this case, the past impedance calculation value is, for example, an impedance calculated by the impedance calculator 11 when the impedance calculation request was previously output from the impedance calculation request unit 12. This previous impedance value is only necessary to be stored in a memory (not illustrated).

The ripple current characteristic switching unit 14 outputs a driving number command to switch the number of drive phases of the multi-phase converter 5, that is, the number of driving of the plurality of reactors 5U, 5V, and 5W to the fuel cell DC/DC converter controller 4 according to the operation state of the fuel cell stack 6. The ripple current characteristic switching unit 14 outputs a phase command to shift the phases of the input voltages for each of the corresponding reactors 5U, 5V, and 5W to the fuel cell DC/DC converter controller 4 on the basis of the number of driving of the reactors 5U, 5V, and 5W.

This causes the ripple current characteristic switching unit 14 to switch the ripple current characteristic (for example, see graphs in FIG. 3) with respect to the input current to the multi-phase converter 5 as described later.

Here, in this embodiment, the ripple current characteristic switching unit 14 switches the ripple current characteristic so as to reduce a ripple current generated from the fuel cell stack 6 with respect to the voltage ratio of the input/output voltages of the multi-phase converter 5 by switching the number of drive phases of the multi-phase converter 5 (the number of driving of the reactors 5U, 5V, and 5W) on the basis of the output voltage from the fuel cell stack 6 and the voltage ratio (the output voltage/input voltage of the multi-phase converter 5) required to the multi-phase converter 5. A method for switching the ripple current characteristic according to the embodiment will be described in details with reference to FIG. 3.

FIG. 3 are graphs illustrating a relationship between the voltage ratio of the fuel cell DC/DC converter (the multi-phase converter) 5 and the amplitude of the ripple current generated in the fuel cell stack 6 according to the first embodiment.

Figure 3A:
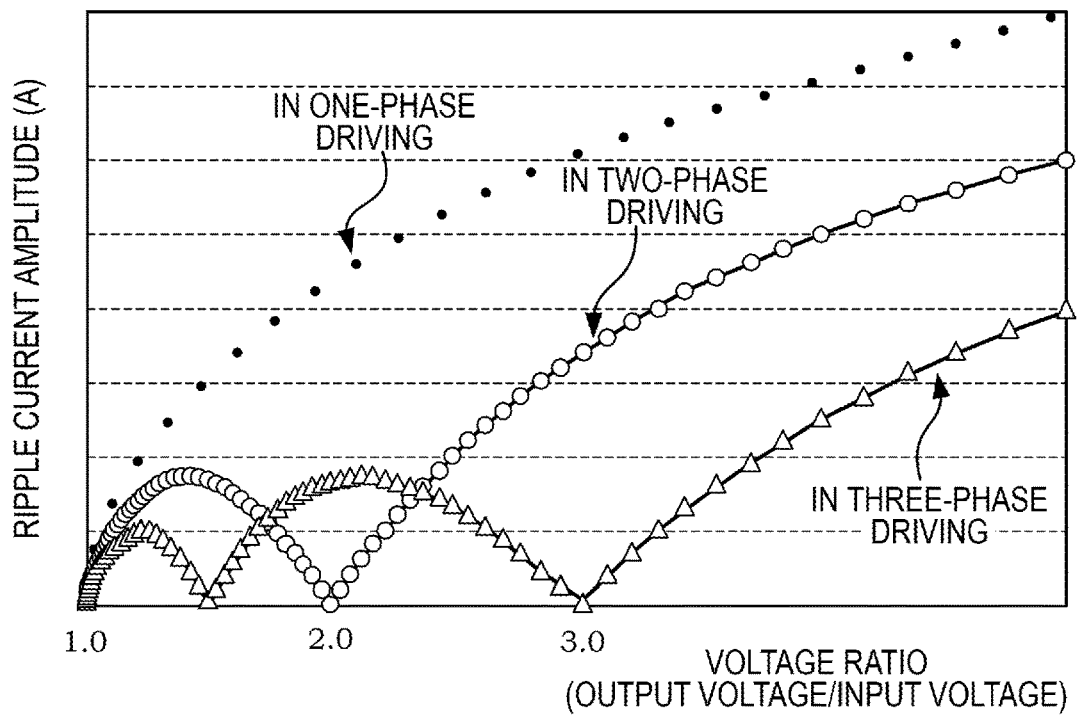
FIG. 3A is a graph illustrating ripple current characteristics corresponding to the number of drive phases of a DC/DC converter for the fuel cell.

FIG. 3A illustrates the ripple current characteristics corresponding to the number of drive phases of the multi-phase converter 5. As illustrated in FIG. 3A, in the case where only one phase of converter (for example, the U-phase converter) is driven, an amplitude (A) of the ripple current increases as the voltage ratio of the input and output of the converter becomes large.

On the other hand, shifting the phases of the input voltages to the multi-phase converter 5 according to the number of drive phases when two or more phases of converters (for example, the U-phase converter and the V-phase converter) are driven causes local minimum points of the ripple current to appear as illustrated in FIG. 3A. That is, when in a two-phase driving, the ripple current becomes the local minimum near 2.0 of the voltage ratio. When in a three-phase driving, the ripple current becomes the local minimum near 1.5 and near 3.0 of the voltage ratio.

In this embodiment, using this ripple current characteristic, the number of drive phases of the multi-phase converter 5 is switched according to the voltage ratio of the input and output of the multi-phase converter 5. Thus, the ripple current component generated from the fuel cell stack 6 is reduced.

Figure 3B:
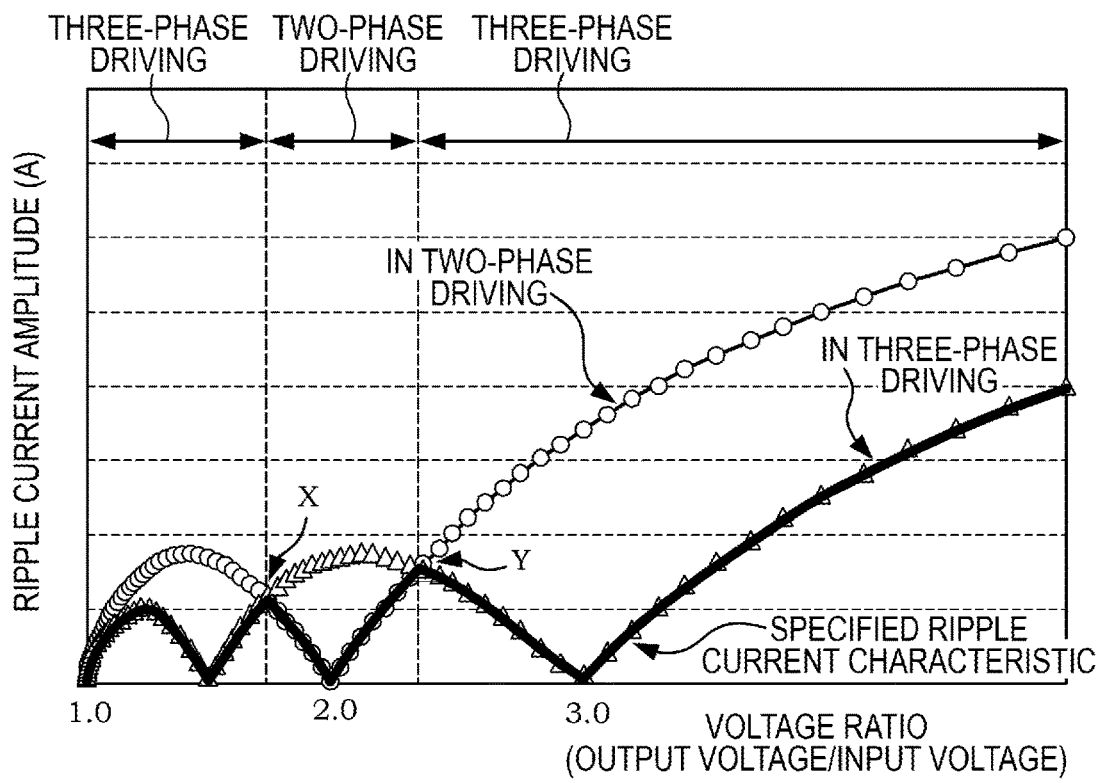
FIG. 3B is a graph illustrating a relationship between a voltage ratio of the DC/DC converter for the fuel cell and an amplitude of a ripple current generated in a fuel cell stack according to the first embodiment.

In this embodiment, as illustrated in FIG. 3B, the ripple current characteristic switching unit 14 especially uses the ripple current characteristics in the two-phase driving and the three-phase driving and switches the ripple current characteristics on the basis of which driving has the smaller amplitude of the ripple currents with respect to the voltage ratio required to the multi-phase converter 5.

That is, the ripple current characteristic switching unit 14 switches the two-phase driving and the three-phase driving of the multi-phase converter 5 such that the ripple current amplitude indicated by the bold line in FIG. 3B is employed and shifts the phases of the input voltages of the multi-phase converter 5 by 360 degrees/the number of drive phase according to the number of drive phase of the multi-phase converter 5. Thus, the ripple current characteristic switching unit 14 determines a ripple current characteristic corresponding to which number of driving of reactors 5U, 5V, or 5W to switch to on the basis of the voltage ratio of the input and output of the multi-phase converter 5. Then, the ripple current characteristic switching unit 14 outputs the driving number command to switch the number of drive phases of the multi-phase converter 5, namely, the number of driving of the reactors 5U, 5V, and 5W, to the fuel cell DC/DC converter controller 4 according to this determination.

Here, a switching timing of the three-phase driving and the two-phase driving will be described. As illustrated in FIG. 3B, a curved line of the ripple current characteristic in the two-phase driving and a curved line of the ripple current characteristics in the three-phase driving intersect at intersection points X and Y. These intersection points are calculated by computing on the basis of the two curved lines obtained, for example, by an experiment.

It should be noted that, in this embodiment, voltage ratios at respective intersection points X and Y may be stored in the ripple current characteristic storage unit 15. In this case, it is only necessary that the ripple current characteristic switching unit 14 determines the number of drive phases of the multi-phase converter 5 on the basis of whether the voltage ratio of the multi-phase converter 5 determined according to the required electric power of the load is larger than the voltage ratios at the respective intersection points X and Y or not.

The ripple current characteristic storage unit 15 is a storage unit for storing the ripple current characteristics that indicates the relationship between the voltage ratio of the input and output of the multi-phase converter 5 and the ripple current according to the number of drive phases of the multi-phase converter 5. In this embodiment, the ripple current characteristics may be stored as a graph (a map) as illustrated in FIG. 3A or may be stored as a table relative to the amplitude of the ripple current and the voltage ratio.

The motor rotation speed and the motor torque of the drive motor 2 detected by the motor rotation speed detector 21 and the motor torque detector 22 are input to the voltage control unit 16. The voltage control unit 16 operates an FC voltage command value and a DC link voltage command value on the basis of various data of the drive motor 2 and information of the ripple current characteristics switched by the ripple current characteristic switching unit 14. The FC voltage command value indicates the driving state of the fuel cell stack 6 and the voltage ratio of the multi-phase converter 5. The DC link voltage command value is for linking the voltage on the output side of the DC/DC converter 8 for the battery 20 to the voltage on the output side of the multi-phase converter 5.

The voltage control unit 16 outputs the operated FC voltage command value to the fuel cell DC/DC converter controller 4 and outputs the operated DC link voltage command value to the battery DC/DC converter controller 7.

Specifically, the voltage control unit 16 determines which one of the motor lower limit voltage of the drive motor 2 or the output voltage from the fuel cell stack 6 should be employed for the DC link voltage command value on the basis of the motor lower limit voltage of the drive motor 2 and the output voltage from the fuel cell stack 6 (that is, the output voltage from the multi-phase converter 5). Then, on the basis of the DC link voltage command value, the fuel cell DC/DC converter controller 4 sets the voltage ratio of the multi-phase converter 5 and the battery DC/DC converter controller 7 sets the voltage ratio of the DC/DC converter 8 for the battery 20.

The voltage control unit 16 calculates a supply voltage of the drive inverter 3 with which the drive motor 2 can operate on the basis of the motor rotation speed and the motor torque of the drive motor 2 detected by the motor rotation speed detector 21 and the motor torque detector 22.

It should be noted that, while in this embodiment, the voltage control unit 16 executes various voltage controls, the electric power adjustment system 1 of the present invention may be configured such that the ripple current characteristic switching unit 14 executes these voltage controls.

Figure 4:
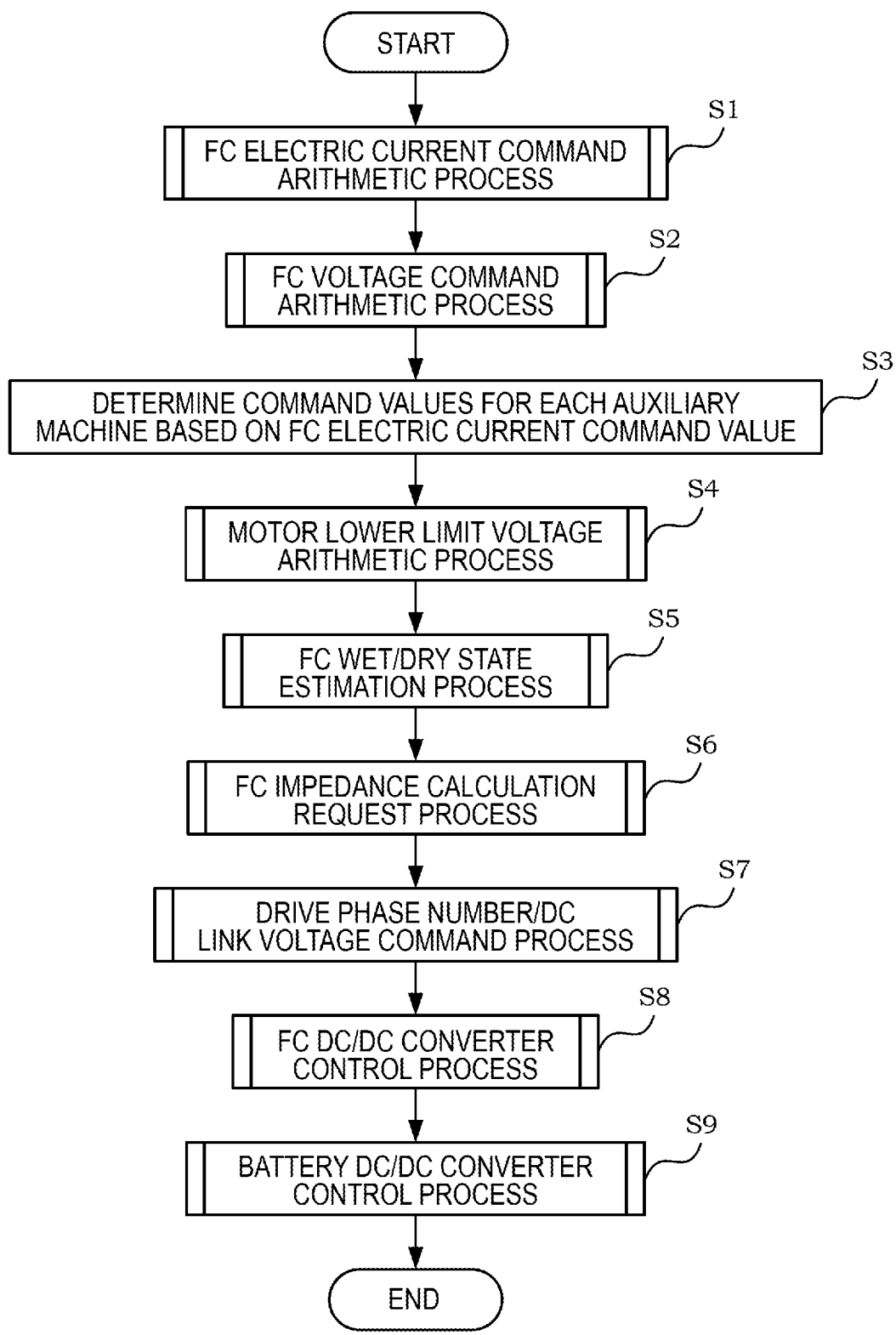
FIG. 4 is a flowchart illustrating an overall control of the fuel cell controller, a fuel cell DC/DC converter controller, and a battery DC/DC converter controller according to the first embodiment of the present invention.

Next, with reference to a flowchart in FIG. 4, an overall operation of the electric power adjustment system 1 according to the embodiment will be described. It should be noted that while the flowchart in FIG. 4 illustrates the overall operation of the electric power adjustment system 1 of this embodiment, an additional step may be included as necessary. A control method for the electric power adjustment system 1 of the present invention is a constituent of a part of the overall operation.

FIG. 4 is the flowchart (main process flow) illustrating the overall control for the fuel cell controller 10, the fuel cell DC/DC converter controller 4, and the battery DC/DC converter controller 7 of the electric power adjustment system 1 according to the first embodiment of the present invention.

The control according to this flowchart is executed at least at timings when the operation state of the drive motor 2 or the operation state of the auxiliary machines 30 varies. However, this control may be executed at every predetermined time. The order of each step may be changed within a range without a conflict.

First, the fuel cell controller 10 executes an FC electric current command arithmetic process for determining an electric current command value for the fuel cell stack 6 (Step S1). The fuel cell controller 10 executes an FC voltage command arithmetic process for determining a voltage command value for the fuel cell stack 6 (Step S2).

Next, the fuel cell controller 10 determines various operation command values for each auxiliary machine included in the auxiliary machines 30 on the basis of the electric current command value (an FC electric current command value described later) and the voltage command value for the fuel cell stack 6 determined at Steps S1 and S2 (Step S3). The fuel cell controller 10 outputs the determined command values to each of the auxiliary machines.

Next, the fuel cell controller 10 executes a motor lower limit voltage arithmetic process for determining the motor lower limit voltage of the drive motor 2, which is the input voltage of the drive inverter 3 (Step S4).

Next, the fuel cell controller 10 executes an FC wet/dry state estimation process for estimating the wet/dry state of the fuel cell stack 6 to control the operation state of the fuel cell stack 6 (Step S5).

Next, the fuel cell controller 10 executes an FC impedance calculation request process for determining whether the impedance of the fuel cell stack 6 should be calculated or not on the basis of the wet/dry state of the fuel cell stack 6 specified by the FC wet/dry state estimation process executed at Step S5 (Step S6).

Next, the fuel cell controller 10 determines the number of drive phases of the multi-phase converter 5 and executes a drive phase number/DC link voltage command process for specifying what voltage value the DC link voltage should be (Step S7). The fuel cell controller 10 outputs the number of drive phases command and the phase command to the fuel cell DC/DC converter controller 4 on the basis of the number of drive phases thus determined (see FIG. 2). The fuel cell controller 10 outputs the FC voltage command and the DC link voltage command to the fuel cell DC/DC converter controller 4 and the battery DC/DC converter controller 7, respectively, on the basis of the DC link voltage thus specified (see FIG. 2). It should be noted that the DC link voltage command is output to the fuel cell DC/DC converter controller 4 as necessary.

Next, the fuel cell DC/DC converter controller 4 executes an FC DC/DC converter control process for performing step up and step down of the multi-phase converter 5 on the basis of the number of drive phases command, the phase command, and the FC voltage command input from the fuel cell controller 10 (Step S8).

Next, the battery DC/DC converter controller 7 executes a battery DC/DC converter control process for performing step up and step down of the DC/DC converter 8 on the basis of the DC link voltage command input from the fuel cell controller 10 (Step S9).

Then, the fuel cell controller 10, the fuel cell DC/DC converter controller 4, and the battery DC/DC converter controller 7 terminate the overall control sequence according to the embodiment illustrated in FIG. 4.

Next, each subroutine in FIG. 4 will be each described with reference to the flowchart.

Figure 5:
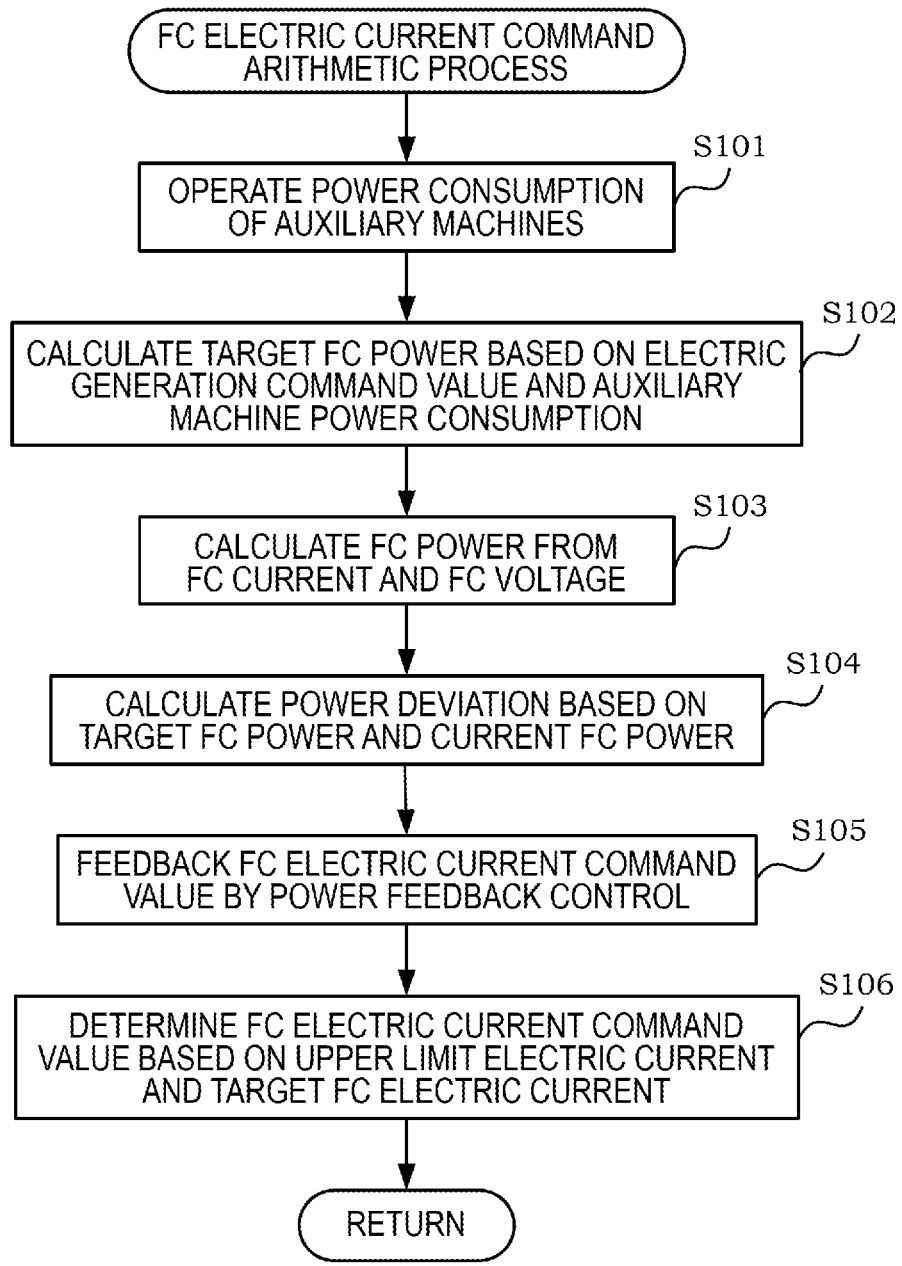
FIG. 5 is a flowchart illustrating an FC electric current command arithmetic process executed by the fuel cell controller.

FIG. 5 is a subroutine corresponding to Step S1 in FIG. 4 and is a flowchart illustrating the FC electric current command arithmetic process executed by the fuel cell controller 10.

In this FC electric current command arithmetic process, the fuel cell controller 10 firstly operates power consumption consumed by each auxiliary machine of the auxiliary machines 30 (Step S101). Then, the fuel cell controller 10 calculates target fuel cell power on the basis of an electric generation command value for the battery 20 and the fuel cell stack 6 and the power consumption of the auxiliary machines 30 operated at Step S101 (Step S102).

It should be noted that the electric generation command value for the fuel cell stack 6 is to indicate how much electric generation is necessary as the fuel cell stack 6. The fuel cell controller 10 determines this electric generation command value on the basis of an accelerator pedal depression amount, that is, an accelerator position (accelerator opening degree) of the accelerator pedal, the driving state of the drive motor 2 and similar parameter from a driver boarding in the vehicle of this embodiment.

Next, the fuel cell controller 10 calculates current output power from the fuel cell stack 6 on the basis of the output current value from the fuel cell stack 6 detected by the electric current sensor 61 and the output voltage value from the fuel cell stack 6 detected by the voltage sensor 62 (Step S103). It should be noted that this output power from the fuel cell stack 6 is obtained by multiplying the output current value and the output voltage value from the fuel cell stack 6.

Next, the fuel cell controller 10 calculates a power deviation of the fuel cell stack 6 on the basis of the target fuel cell power of the fuel cell stack 6 calculated at Step S102 and the actual output power from the fuel cell stack 6 calculated at Step S103 (Step S104). This power deviation is obtained on the basis of a difference between the target fuel cell power and the actual output voltage.

Next, the fuel cell controller 10 performs a power feedback control based on a PI control based on the power deviation of the fuel cell stack 6 calculated at Step S104. The fuel cell controller 10 corrects the electric current command value (target fuel cell electric current value) of the fuel cell stack 6 by this power feedback control (Step S105).

Next, the fuel cell controller 10 determines the FC electric current command value, which is the electric current command value for the fuel cell stack 6, on the basis of an upper limit electric current value of the fuel cell stack 6 preliminarily set in the fuel cell controller 10 and the target fuel cell electric current value obtained at Step S105 (Step S106).

Specifically, the fuel cell controller 10 compares the upper limit electric current value of the fuel cell stack 6 and the target fuel cell electric current value and determines the smaller value as the FC electric current command value. Then, after the FC electric current command value is determined, the fuel cell controller 10 terminates this FC electric current command arithmetic process and returns to the main process flow.

It should be noted that the upper limit electric current value of the fuel cell stack 6 means the upper limit value of the electric current value that the fuel cell stack 6 can output and is obtained through, for example, an experiment as necessary.

The fuel cell controller 10 controls flow rates, pressures, and the like of the anode gas and the cathode gas such that the output current from the fuel cell stack 6 becomes this FC electric current command value on the basis of the FC electric current command value determined at Step S106. This is because the flow rates and the like of the anode gas and the cathode gas are controlled in order to control the output from the fuel cell stack 6, and the flow rates and the like of these gases are controlled on the basis of the output current from the fuel cell stack 6.

Figure 6:
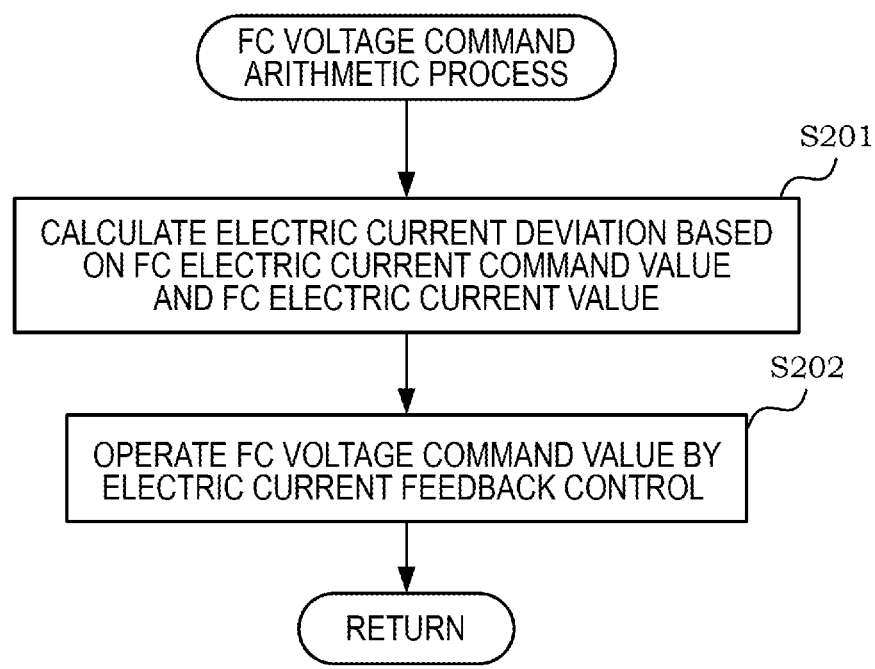
FIG. 6 is a flowchart illustrating an FC voltage command arithmetic process executed by the fuel cell controller.

FIG. 6 is a subroutine corresponding to Step S2 in FIG. 4 and is a flowchart illustrating the FC voltage command arithmetic process executed by the fuel cell controller 10.

In this FC voltage command arithmetic process, the fuel cell controller 10 calculates an electric current deviation on the basis of the FC electric current command value determined at Step S104 in the FC electric current command arithmetic process and the output current value from the fuel cell stack 6 detected by the electric current sensor 61 (Step S201). This electric current deviation is obtained on the basis of a difference between the FC electric current command value of the fuel cell stack 6 and the actual output current value.

Next, the fuel cell controller 10 performs an electric current feedback control based on the PI control based on the electric current deviation calculated at Step S201. According to a change in the output current from the fuel cell stack 6 caused by this electric current feedback control, the fuel cell controller 10 operates the FC voltage command value, which is a target voltage value of the fuel cell stack 6, on the basis of an IV characteristic curve preliminarily stored in the memory (not illustrated) (Step S202). Then, the fuel cell controller 10 terminates this FC voltage command arithmetic process and returns to the main process flow.

It should be noted that the fuel cell controller 10 may be configured to control the flow rate, the pressures, and the like of the anode gas and the cathode gas such that the output voltage value from the fuel cell stack 6 becomes this FC voltage command value on the basis of the FC voltage command value determined at Step S202 instead of controlling the output current from the fuel cell stack 6 to become the FC electric current command value.

Figure 7:
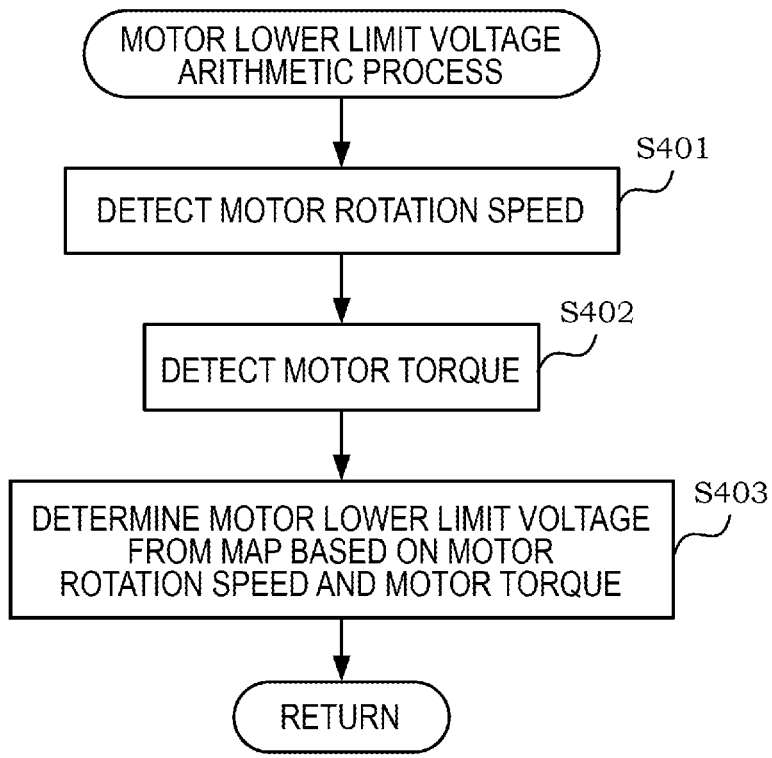
FIG. 7 is a flowchart illustrating a motor lower limit voltage arithmetic process executed by the fuel cell controller.

FIG. 7 is a subroutine corresponding to Step S4 in FIG. 4 and is a flowchart illustrating the motor lower limit voltage arithmetic process executed by the fuel cell controller 10.

In this motor lower limit voltage arithmetic process, the fuel cell controller 10 firstly detects the motor rotation speed of the drive motor 2 by the motor rotation speed detector 21 (Step S401), and detects the motor torque of the drive motor 2 by the motor torque detector 22 (Step S402).

It should be noted that the higher the motor rotation speed of the drive motor 2 gets, the more an induced voltage is generated in the drive motor 2. In view of this, in the case where the supply voltage to the drive motor 2, that is, an output voltage from the drive inverter 3 is not higher than the induced voltage, the drive motor 2 cannot be driven. Accordingly, in this motor lower limit voltage arithmetic process, the motor rotation speed of the drive motor 2 is detected first.

While the illustration is omitted, an electric current sensor that detects a supply current actually input to the drive motor 2 is disposed to detect the motor torque of the drive motor 2 and its efficiency. The fuel cell controller 10 may detect the motor torque of the drive motor 2 on the basis of the detected supply current value.

Next, the fuel cell controller 10 determines the motor lower limit voltage on the basis of the motor rotation speed and the motor torque of the drive motor 2 detected at Steps S401 and S402, with reference to a motor rotation speed-motor torque map preliminarily stored in, for example, the memory (not illustrated) in the fuel cell controller 10 (Step S403).

It should be noted that it is only necessary that the motor rotation speed-motor torque map, while its illustration is omitted, is preliminarily obtained from, for example, experimental data, and the map data of the experimental data is stored in the memory.

Then, after determining the motor lower limit voltage, the fuel cell controller 10, terminates this motor lower limit voltage arithmetic process and returns to the main process flow.

Figure 8:
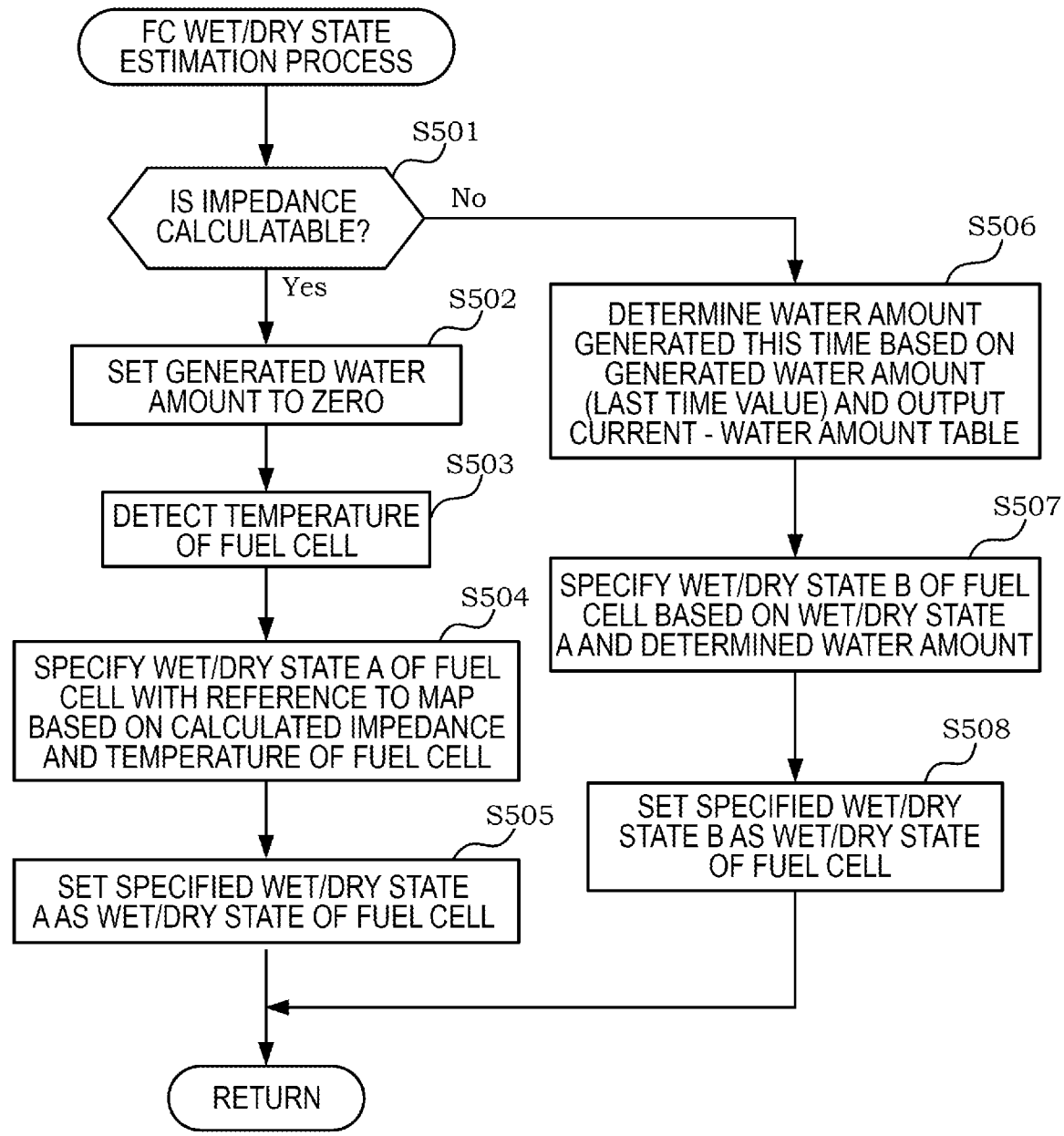
FIG. 8 is a flowchart illustrating an FC wet/dry state estimation process executed by the fuel cell controller.

FIG. 8 is a subroutine corresponding to Step S5 in FIG. 4 and is a flowchart illustrating the FC wet/dry state estimation process executed by the fuel cell controller 10.

In this FC wet/dry state estimation process, the fuel cell controller 10 firstly determines whether the impedance of the fuel cell stack 6 is calculable or not on the basis of the output electric current value from the fuel cell stack 6 detected by the electric current sensor 61 and the output voltage value from the fuel cell stack 6 detected by the voltage sensor 62 (Step S501).

For example, after the fuel cell stack 6 receives the FC electric current command value and the FC voltage command value from the fuel cell controller 10, in the case where the operation state is in a transient state so as to meet each of the command values, the fuel cell controller 10 simply determines that the impedance of the fuel cell stack 6 is not calculable.

Also in the case where the impedance detection circuit is saturated with a reason, such as a large ripple current is generated, the fuel cell controller 10 simply determines that the impedance of the fuel cell stack 6 is not calculable.

In the case where the impedance of the fuel cell stack 6 is determined to be calculable at Step S501, the fuel cell controller 10 resets a water amount generated from the fuel cell stack 6 (Step S502). That is, the fuel cell controller 10 sets the water amount generated from the fuel cell stack 6 to zero.

Next, the fuel cell controller 10 detects a temperature of the fuel cell stack 6 using a temperature sensor (not illustrated) (Step S503).

Next, the impedance calculator 11 of the fuel cell controller 10 calculates the impedance of the fuel cell stack 6 on the basis of the alternating-current components in the output current and the output voltage from the fuel cell stack 6 detected in the FC electric current command arithmetic process and the FC voltage command arithmetic process. Then, the fuel cell controller 10 specifies a wet/dry state A of the fuel cell stack 6 on the basis of the thus calculated impedance of the fuel cell stack 6 and the temperature of the fuel cell stack 6 detected at Step S503 with reference to an impedance-fuel cell temperature map preliminarily stored in, for example, the memory (not illustrated) (Step S504).

It should be noted that it is only necessary that the impedance-fuel cell temperature map, while its illustration is omitted, is preliminarily obtained from, for example, experimental data, and the map data of the experimental data is stored in the memory.

Next, the wet/dry state estimator 13 of the fuel cell controller 10 sets the wet/dry state A of the fuel cell stack 6 specified as described above as the wet/dry state of the fuel cell stack 6 (Step S505), terminates this FC wet/dry state estimation process, and returns to the main process flow.

On the other hand, in the case where the impedance of the fuel cell stack 6 is not calculable at Step S501, the fuel cell controller 10 determines the water amount having been generated from the last time the wet/dry state A of the fuel cell stack 6 was specified until now (Step S506).

Here, the water amount generated from the fuel cell stack 6 and an integrated value of the output current from the fuel cell stack 6 have a predetermined relationship. Accordingly, the fuel cell controller 10 determines the water amount generated this time with reference to a fuel cell output current-water amount table preliminarily stored in, for example, the memory (not illustrated).

Here, the fuel cell output current-water amount table is a table indicating the relationship between the output current (the integrated value) from the fuel cell stack 6 and the water amount generated during the detection period. The output current from the fuel cell stack 6 is detected by the electric current sensor 61 and output to the fuel cell controller 10. In this embodiment, for example, it is only necessary that the impedance calculation request unit 12 integrates the output electric current value from the last time the impedance was calculated by the impedance calculator 11 and stores the integrated value in the memory (not illustrated). This ensures the fuel cell controller 10 specifying how much water amount has been generated within the fuel cell stack 6 from the last time the water amount was set to zero (Step S502) on the basis of this output electric current integrated value.

Next, the fuel cell controller 10 reads out the wet/dry state A of the fuel cell stack 6 specified last time from the memory (not illustrated) and refers to a wet/dry state-water amount map preliminarily stored, for example, in this memory. Then, the fuel cell controller 10 specifies a wet/dry state B of the fuel cell stack 6 on the basis of this wet/dry state A and the water amount of this time determined at Step S506 (Step S507).

Next, the wet/dry state estimator 13 of the fuel cell controller 10 sets the wet/dry state B of the fuel cell stack 6 specified as described above as the wet/dry state of the fuel cell stack 6 (Step S508), terminates this FC wet/dry state estimation process, and returns to the main process flow.

Figure 9:
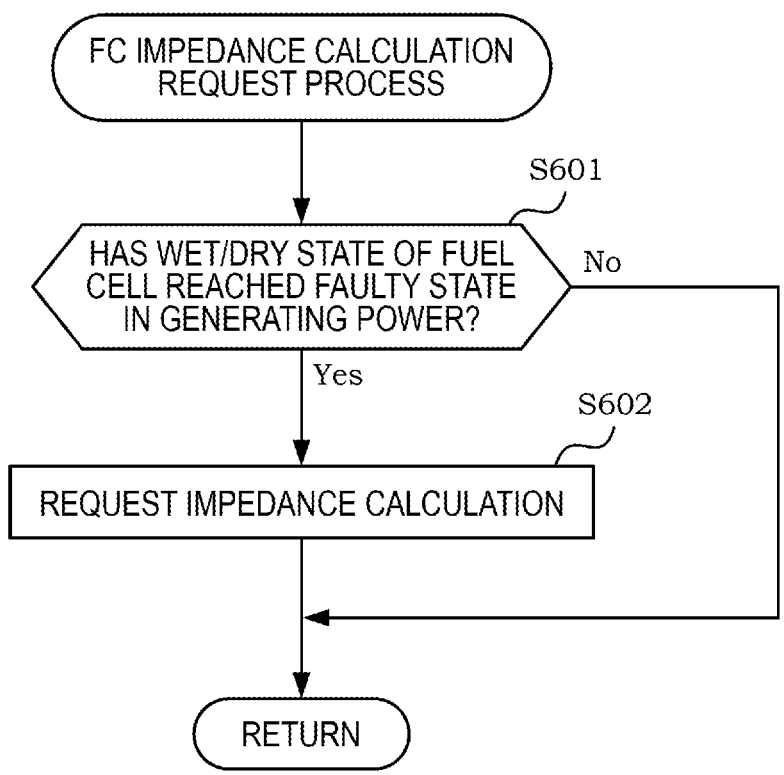
FIG. 9 is a flowchart illustrating an FC impedance calculation request process executed by the fuel cell controller.

FIG. 9 is a subroutine corresponding to Step S6 in FIG. 4 and is a flowchart illustrating the FC impedance calculation request process executed by the fuel cell controller 10.

In this FC impedance calculation request process, the fuel cell controller 10 firstly determines whether the fuel cell stack 6 has reached a faulty state in generating power or not on the basis of the wet/dry state A or B of the fuel cell stack 6 specified by the FC wet/dry state estimation process (Step S601).

Here, the fuel cell controller 10 determines that the fuel cell stack 6 has reached the faulty state in generating power when the fuel cell stack 6 is in a state of overdry or conversely, the fuel cell stack 6 is in a state of excessively wet on the basis of the wet/dry state of the fuel cell stack 6 set in the FC wet/dry state estimation process. It should be noted that the faulty state in generating power of the fuel cell stack 6 can be said as a state where the power generation efficiency of the fuel cell stack 6 is lowered.

At Step S601, when the fuel cell stack 6 is determined not to have reached the faulty state in generating power, the fuel cell controller 10 terminates this FC impedance calculation request process as it is. In this case, the wet/dry state estimator 13 executes the process in Steps S506 to S508 in the FC wet/dry state estimation process to estimate the wet/dry state of the fuel cell stack 6.

On the other hand, when the fuel cell stack 6 is determined to have reached the faulty state in generating power at Step S601, the impedance calculation request unit 12 of the fuel cell controller 10 requests the impedance calculator 11 to calculate the impedance. That is, the impedance calculation request unit 12 outputs the impedance calculation request (Step S602), and the fuel cell controller 10 terminates this FC impedance calculation request process.

Figure 10:
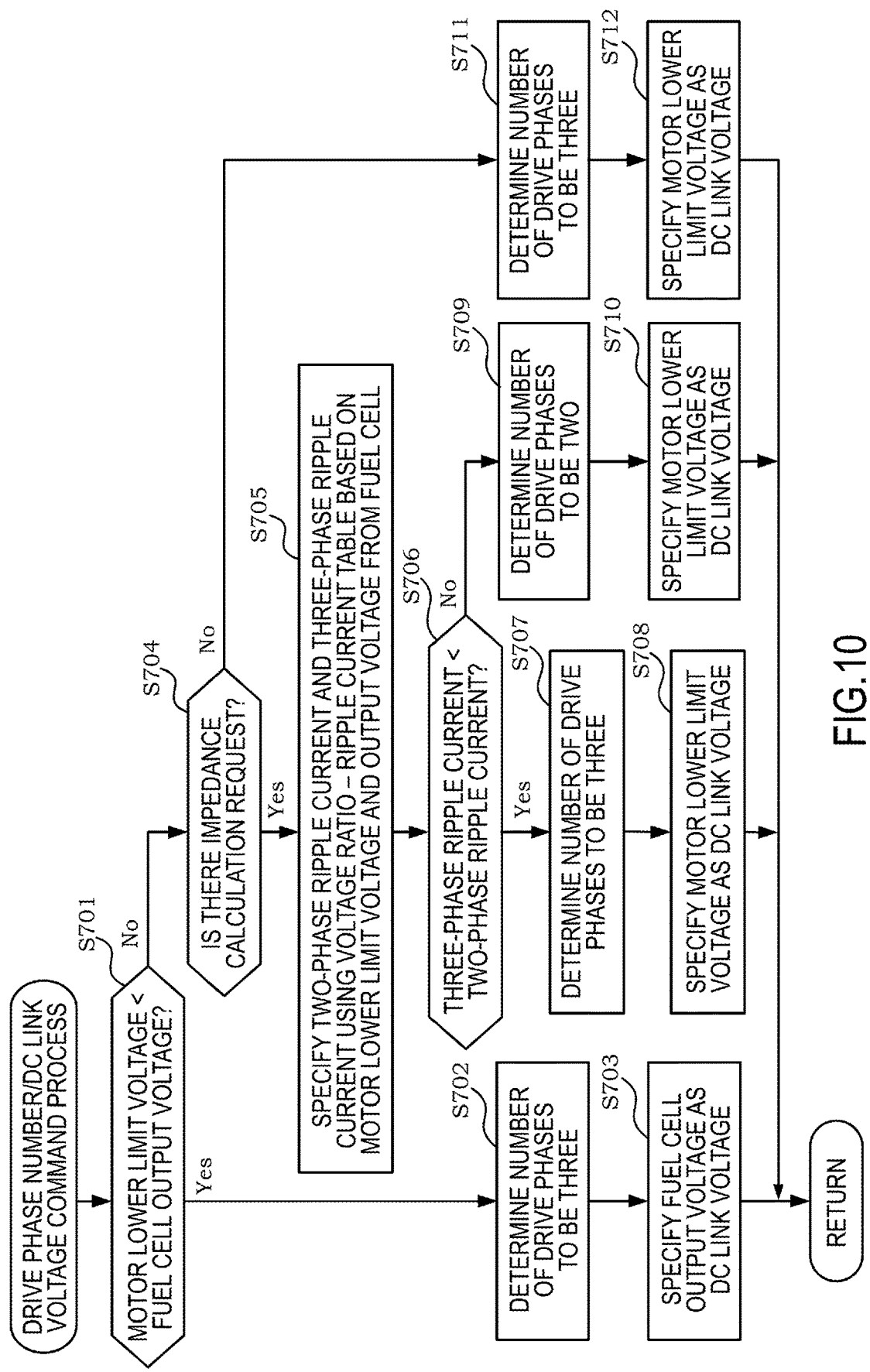
FIG. 10 is a flowchart illustrating a drive phase number/DC link voltage command process executed by the fuel cell controller.

FIG. 10 is a subroutine corresponding to Step S7 in FIG. 4, and is a flowchart illustrating the drive phase number/DC link voltage command process executed by the fuel cell controller 10.

In this drive phase number/DC link voltage command process, the fuel cell controller 10 compares the motor lower limit voltage of the drive motor 2 determined by the motor lower limit voltage arithmetic process and the output voltage value from the fuel cell stack 6 detected by the voltage sensor 62. Then, the fuel cell controller 10 determines whether the motor lower limit voltage is smaller than the output voltage value from the fuel cell stack 6 or not (Step S701).

Then, in the case where the motor lower limit voltage is determined to be smaller than the output voltage value from the fuel cell stack 6 at Step S701, the fuel cell controller 10 transitions to the process at Step S702. Then, the ripple current characteristic switching unit 14 of the fuel cell controller 10 determines the number of drive phases of the multi-phase converter 5 to be three (Step S702).

Next, the voltage control unit 16 of the fuel cell controller 10 specifies the output power from the fuel cell stack 6, that is, the output voltage from the multi-phase converter 5 as the DC link voltage (Step S703). The fuel cell controller 10 terminates this drive phase number/DC link voltage command process.

On the other hand, in the case where it is determined that the motor lower limit voltage is not smaller than the output voltage value from the fuel cell stack 6, that is, the motor lower limit voltage is larger than the output voltage value from the fuel cell stack 6 at Step S701, the fuel cell controller 10 transitions to the process at Step S704.

Next, the fuel cell controller 10 determines whether there is the impedance calculation request output from the impedance calculation request unit 12 or not (Step S704). Then, in the case where it is determined that there is the impedance calculation request, the fuel cell controller 10 specifies the ripple current in the two-phase driving (hereinafter referred to as the "two-phase ripple current") and the ripple current in the three-phase driving (hereinafter referred to as the "three-phase ripple current") on the basis of the motor lower limit voltage and the output voltage from the fuel cell stack 6 (Step S705).

Specifically, the fuel cell controller 10 reads out the ripple current characteristics in the two-phase driving and the ripple current characteristics in the three-phase driving illustrated in FIG. 3B, which are stored in the ripple current characteristic storage unit 15 (the ripple current characteristics may be a table or a characteristic diagram map), and specifies the amplitudes of the respective ripple currents when the voltage ratio is obtained by (the motor lower limit voltage of the drive motor 2)/(the output voltage from the fuel cell stack 6), which is the voltage ratio of the input and output of the multi-phase converter 5.

Next, the fuel cell controller 10 determines whether the three-phase ripple current is smaller than the two-phase ripple current or not on the basis of the three-phase ripple current and the two-phase ripple current specified at Step S705 (Step S706).

Then, in the case where the three-phase ripple current is smaller than the two-phase ripple current, the ripple current characteristic switching unit 14 of the fuel cell controller 10 determines the number of drive phases of the multi-phase converter 5 to be three (Step S707). Next, the voltage control unit 16 of the fuel cell controller 10 specifies the motor lower limit voltage of the drive motor 2 as the DC link voltage (Step S708). The fuel cell controller 10 terminates this drive phase number/DC link voltage command process.

On the other hand, in the case where it is determined that the three-phase ripple current is not smaller than the two-phase ripple current, that is, the three-phase ripple current is larger than the two-phase ripple current, the ripple current characteristic switching unit 14 of the fuel cell controller 10 determines the number of drive phases of the multi-phase converter 5 to two (Step S709). Next, the voltage control unit 16 of the fuel cell controller 10 specifies the motor lower limit voltage of the drive motor 2 as the DC link voltage (Step S710). The fuel cell controller 10 terminates this drive phase number/DC link voltage command process.

On the other hand, in the case where it is determined that there is no impedance calculation request at Step S704, the fuel cell controller 10 determines that the power generation efficiency of the fuel cell stack 6 is in an optimum state. Then, the ripple current characteristic switching unit 14 of the fuel cell controller 10 determines the number of drive phases of the multi-phase converter 5 to be three (Step S711). Next, the voltage control unit 16 of the fuel cell controller 10 specifies the motor lower limit voltage of the drive motor 2 as the DC link voltage (Step S712). The fuel cell controller 10 terminates this drive phase number/DC link voltage command process.

It should be noted that in the case where the motor lower limit voltage of the drive motor 2 is smaller than the output voltage from the fuel cell stack 6, the output voltage from the fuel cell stack 6 is input to the drive inverter 3 as it is via each of the rectifier diodes 52U, 52V, and 52W without the multi-phase converter 5 converting the voltage ratio of the input and output of the multi-phase converter 5. Therefore, the ripple current characteristic switching unit 14 of the fuel cell controller 10 may set this number of drive phases to one instead of setting the number of drive phases of the multi-phase converter 5 to three as in this embodiment. However, the number of drive phases of the multi-phase converter 5 being set to three causes ⅓ of the output current to flow into the three reactors 5U, 5V, and 5W, thereby entirely reducing a copper loss (a resistance loss caused by a copper wire including the reactor).

In this embodiment, at Steps S703, S708, S710 and S712, the fuel cell controller 10 specifies any one of the motor lower limit voltage of the drive motor 2 or the output voltage from the fuel cell stack 6 as the DC link voltage. However, in the flowchart of the drive phase number/DC link voltage command process, it may be configured such that the fuel cell controller 10 specifies any one of the motor lower limit voltage of the drive motor 2 or the output voltage from the fuel cell stack 6 as the DC link voltage after the determination of comparison of the motor lower limit voltage of the drive motor 2 and the output voltage from the fuel cell stack 6 at Step S701, and determines the number of drive phases of the multi-phase converter 5 at the end.

Figure 11:
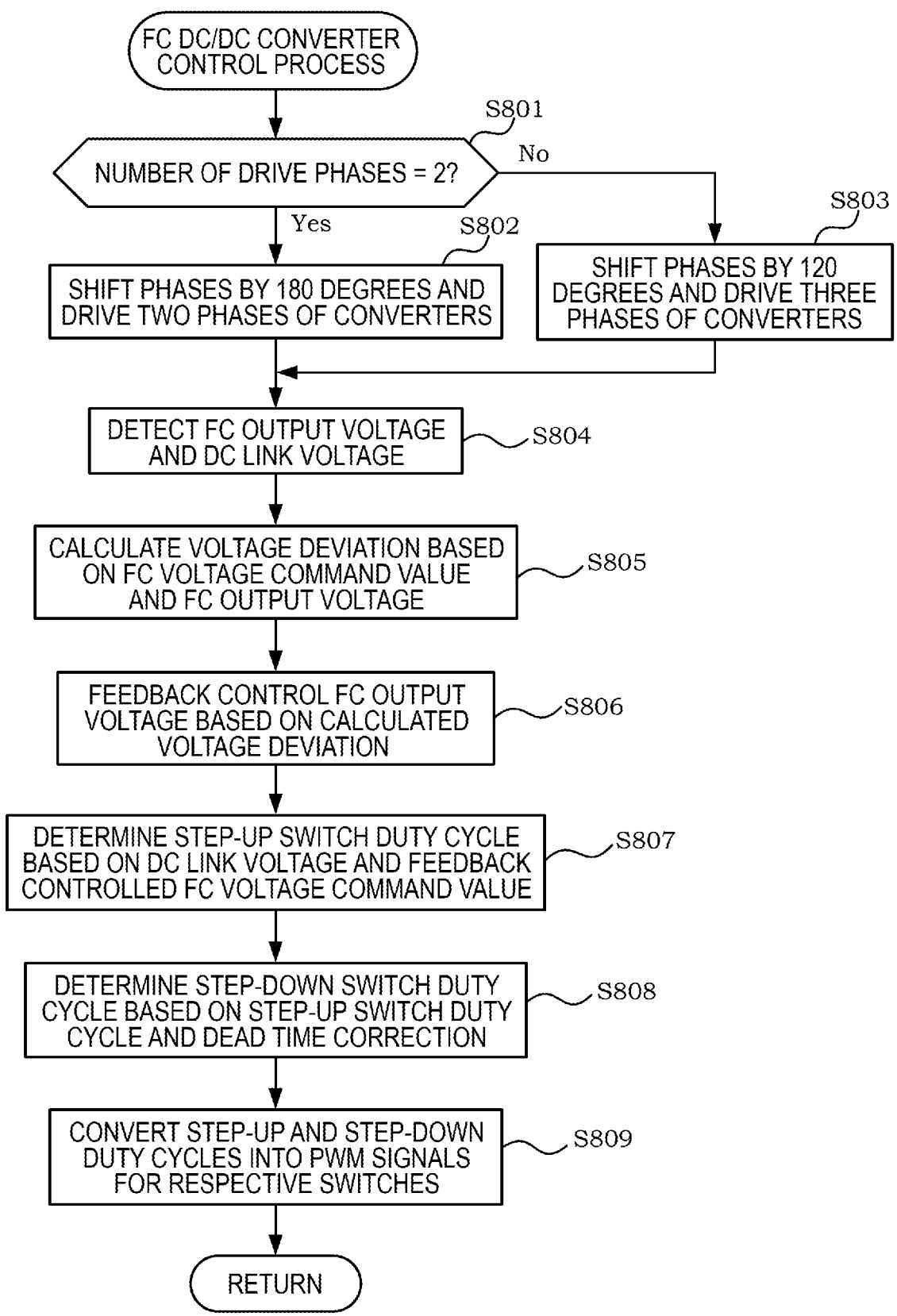
FIG. 11 is a flowchart illustrating an FC DC/DC converter control process executed by the fuel cell DC/DC converter controller.

FIG. 11 is a subroutine corresponding to Step S8 in FIG. 4, and is a flowchart illustrating the FC DC/DC converter control process executed by the fuel cell DC/DC converter controller 4.

In this FC DC/DC converter control process, the fuel cell DC/DC converter controller 4 firstly determines whether the number of drive phases of the multi-phase converter 5 has been determined to be two or not in the drive phase number/DC link voltage command process (Step S801).

Then, in the case where it is determined that the number of drive phases of the multi-phase converter 5 has been determined to be two, the fuel cell DC/DC converter controller 4 shifts the phases of the input currents to the two phases of converters to be driven of the multi-phase converter 5 by 180 degrees and drives those two phases of converters (Step S802). On the other hand, in the case where it is determined that the number of drive phases of the multi-phase converter 5 has been determined, not to be two, but to be three, the fuel cell DC/DC converter controller 4 shifts the phases of the input currents to all phases of converters of the multi-phase converter 5 by 120 degrees and drives those three phases of converters (Step S803).

Next, the fuel cell DC/DC converter controller 4 detects the output voltage from the fuel cell stack 6 and the output voltage from the multi-phase converter 5, that is, the DC link voltage using the voltage sensors 62 and 65 (Step S804). Then, the fuel cell DC/DC converter controller 4 calculates a voltage deviation of the output voltage from the fuel cell stack 6 on the basis of the FC voltage command value input from the fuel cell controller 10 and the detected output voltage value from the fuel cell stack 6 (Step S805). This voltage deviation is obtained on the basis of a difference between the FC voltage command value and the detected output voltage value from the fuel cell stack 6.

Next, the fuel cell DC/DC converter controller 4 performs the voltage feedback control based on the PI control to the output voltage from the fuel cell stack 6 (that is, the voltage ratio of the input and output of the multi-phase converter 5) on the basis of the voltage deviation of the fuel cell stack 6 calculated at Step S805 (Step S806).

Next, the fuel cell DC/DC converter controller 4 determines a DUTY cycle of a step-up switch (lower stage) on the basis of the DC link voltage and the FC voltage command value that is feedback controlled (Step S807), and determines a DUTY cycle of a step-down switch (upper stage) on the basis of thus determined DUTY cycle of the step-up switch (lower stage) and a dead time correction (Step S808).

Next, the fuel cell DC/DC converter controller 4 uses the step-up DUTY cycle and the step-down DUTY cycle determined at Steps S807 and S808 to convert and generate PWM signals that are to be output to the respective switching elements 51U to 52W and 53U to 53W (Step S809). Then, the fuel cell DC/DC converter controller 4 outputs these PWM signals to the corresponding switching elements 51U to 52W and 53U to 53W, and terminates this FC DC/DC converter control process.

Figure 12:
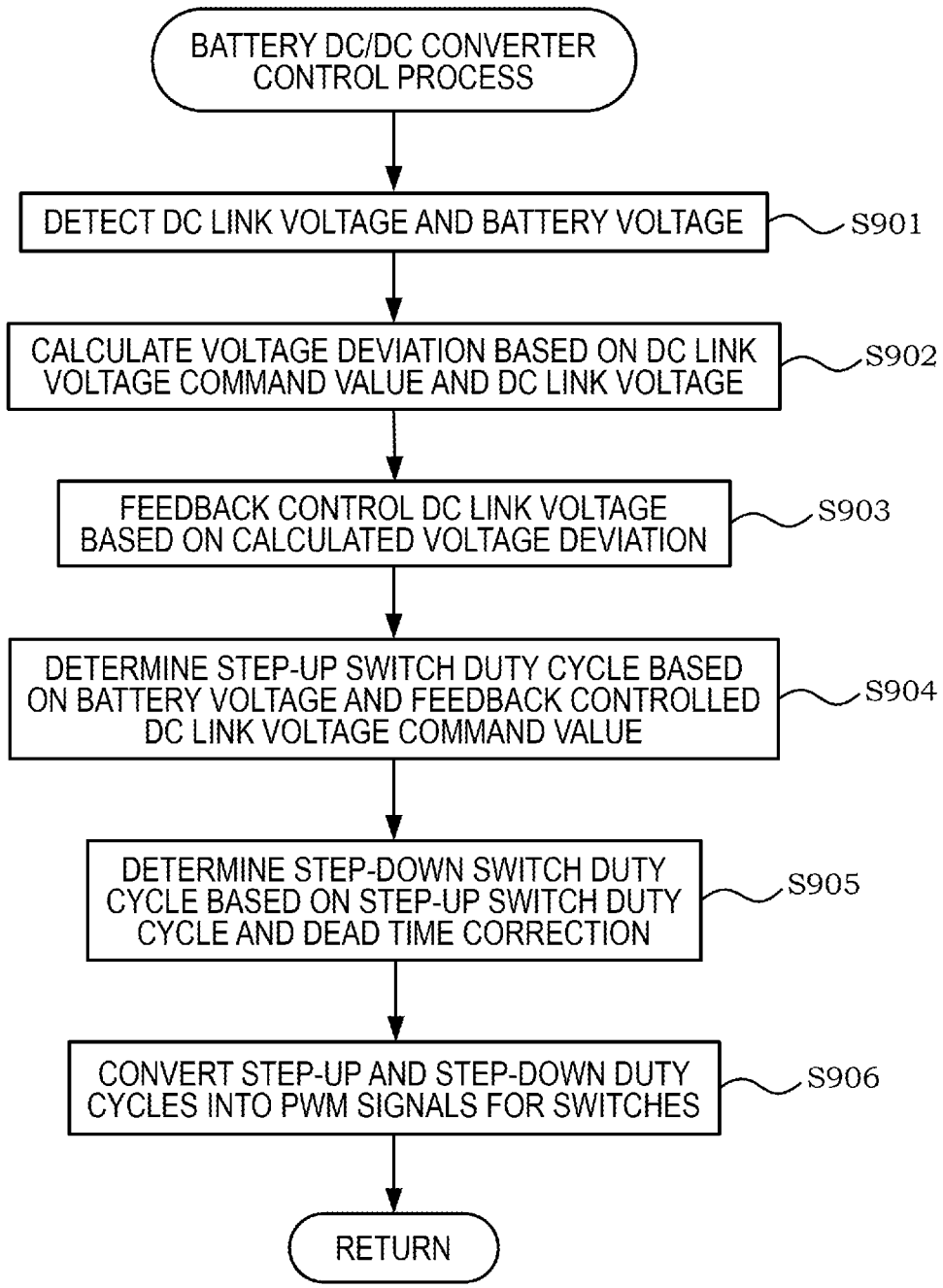
FIG. 12 is a flowchart illustrating a battery DC/DC converter control process executed by the battery DC/DC converter controller.

FIG. 12 is a subroutine corresponding to Step S9 in FIG. 4, and is a flowchart illustrating the battery DC/DC converter control process executed by the battery DC/DC converter controller 7.

In this battery DC/DC converter control process, the battery DC/DC converter controller 7 firstly detects the output voltage from the multi-phase converter 5, that is, the DC link voltage and the output voltage from the battery 20 using the voltage sensors 65 and 67 (Step S901). Then, the battery DC/DC converter controller 7 calculates a voltage deviation of the DC link voltage on the basis of the DC link voltage command value and the detected DC link voltage value (Step S902). This voltage deviation is obtained on the basis of a difference between the DC link voltage command value and the detected DC link voltage value.

Next, the battery DC/DC converter controller 7 performs the voltage feedback control based on the PI control to the DC link voltage (that is, the voltage ratio of the input and output of the DC/DC converter 8) on the basis of the voltage deviation of the DC link voltage calculated at Step S902 (Step S903).

Next, the battery DC/DC converter controller 7 determines a DUTY cycle of a step-up switch (lower stage) on the basis of the output voltage from the battery 20 and the DC link voltage command value that is feedback controlled (Step S904), and determines a DUTY cycle of a step-down switch (upper stage) on the basis of thus determined DUTY cycle of the step-up switch (lower stage) and a dead time correction (Step S905).

Next, the battery DC/DC converter controller 7 uses the step-up DUTY cycle and the step-down DUTY cycle determined at Steps S904 and S905 to convert and generate a PWM signal that is to be output to the switching element 81 (Step S906). Then, the battery DC/DC converter controller 7 outputs this PWM signal to the switching element 81, and terminates this battery DC/DC converter control process.

As described above, the electric power adjustment system 1 according to this embodiment includes the fuel cell stack 6 and the multi-phase converter 5. The fuel cell stack 6 is connected to the drive motor 2, which is the load. The multi-phase converter 5 is connected between this fuel cell stack 6 and the drive motor 2, constituted of a plurality of the phases (in this embodiment, three phases), and converts (steps up) the output voltage from the fuel cell stack 6 to the input voltage to the drive inverter 3 with a predetermined required voltage ratio. The electric power adjustment system 1 according to this embodiment includes the ripple current characteristic switching unit 14 that switches the ripple current characteristics with respect to the input current to the multi-phase converter 5 by changing the number of drive phases of the multi-phase converter 5 according to the operation state of the fuel cell stack 6 and the required electric power of the load. Since the electric power adjustment system 1 according to this embodiment has such configuration, the ripple component (the ripple current component) with respect to the output current from the fuel cell stack 6 can be reduced. That is, in this embodiment, as illustrated in FIG. 3B, this ripple current can be reduced by setting the multi-phase converter 5 to the number of drive phases corresponding to the bold line in the drawing on the basis of the voltage ratio of the input and output of the multi-phase converter 5. In addition to this, with the electric power adjustment system 1 according to this embodiment, the ripple component (the ripple voltage component) with respect to the output voltage from the fuel cell stack 6 can be reduced. The reduced ripple component in the input voltage and the input current to the multi-phase converter 5 ensures the reduced ripple component in the output voltage from the multi-phase converter 5, that is, the DC link voltage. As the result, the driving voltage and the driving current of the drive motor 2 can be appropriately controlled.

Thus, the electric power adjustment system 1 according to this embodiment can reduce the ripple component (the ripple current component) in the output current from the fuel cell stack 6, thereby not requiring a smoothing condenser with a large capacity. This ensures saving the cost for manufacturing the electric power adjustment system 1 including the fuel cell stack 6. Without disposing an expensive smoothing condenser with a large capacity, simply disposing a smoothing condenser of minimum necessary ensures effectively restraining the impedance detector (the impedance calculator 11) of the fuel cell stack 6 from being in a saturated state. This ensures calculation of the internal impedance of the fuel cell stack 6 as necessary.

The electric power adjustment system 1 according to this embodiment can restrain an increase of the ripple current component as described above, thereby effectively reducing radio noise that is generated from the electric power adjustment system 1. This ensures preventing other devices in the electric power adjustment system 1 and other equipment disposed adjacent to the electric power adjustment system 1 from producing malfunctions.

In the electric power adjustment system 1 according to this embodiment, the number of phases of the multi-phase converter 5 is three or more phases. The ripple current characteristic switching unit 14 is configured to switch the ripple current characteristics such that the ripple current with respect to the voltage ratio of the input and output voltage of the multi-phase converter 5 is reduced by switching the number of drive phases of the multi-phase converter 5 on the basis of the output voltage from the fuel cell stack 6 and the required voltage ratio of the multi-phase converter 5 (the voltage ratio required to the multi-phase converter 5). This ensures further effectively reducing the ripple current component by determining the number of drive phases having the smaller amplitude of the ripple current (the ripple current component) and switching to the determined number of drive phases on the basis of a ripple current component-voltage ratio graph (see FIG. 3B) relative to the number of drive phases of the multi-phase converter 5.

In this case, it is only necessary for the electric power adjustment system 1 according to this embodiment to further include the ripple current characteristic storage unit 15 that stores the ripple current characteristics indicating the relationship between the voltage ratio of the input and output of the multi-phase converter 5 and the ripple current component according to the number of drive phases of the multi-phase converter 5. Then, the ripple current characteristic switching unit 14 simply determines a ripple current characteristic of which number of drive phases of the multi-phase converter 5 to switch to on the basis of the voltage ratio of the input and output of the multi-phase converter 5 and switches the number of drive phases of the multi-phase converter 5 according to the determination. This ensures the reduced ripple current component without requiring the smoothing condenser with the large capacity and a further accurate calculation of the internal impedance of the fuel cell stack 6 as necessary. Therefore, the ripple current characteristic switching unit 14 of the electric power adjustment system 1 according to this embodiment is effective especially when the impedance calculation request for the fuel cell stack 6 is made.

It should be noted that, while in this embodiment, it is described the ripple current characteristic storage unit 15 stores the ripple current characteristics with respect to the number of drive phases of the multi-phase converter 5 as the graphs illustrated in FIG. 3A and FIG. 3B, data format of the ripple current characteristics is not limited to such graphs. The ripple current characteristics may be stored in the ripple current characteristic storage unit 15, for example, as a table of the voltage ratio of the multi-phase converter 5 and the amplitude of the ripple current.

The ripple current characteristic storage unit 15 may store the voltage ratios at the intersection points X and Y in the graph in the two-phase driving and in the three-phase driving instead of storing the ripple current characteristics in the format of the graph or the table as in FIG. 3B. In this case, it is only necessary for the ripple current characteristic switching unit 14 to switch the number of drive phases of the multi-phase converter 5 by comparing the magnitudes at the intersection points X and Y on the basis of the voltage ratio of the multi-phase converter 5 with respect to the DC link voltage.

The electric power adjustment system 1 according to this embodiment, as illustrated in FIG. 1, further includes the (high-voltage) battery 20 and the DC/DC converter 8 for the battery 20. The battery 20 is an electric power supply source different from the fuel cell stack 6. The DC/DC converter 8 for the battery 20 is connected between the battery 20 and the drive motor 2, which is the load. Then, the ripple current characteristic switching unit 14 may be configured to set the supply voltage supplied by the DC/DC converter 8 for the battery 20 to the drive motor 2 according to the output voltage from the fuel cell stack 6 and switch the ripple current characteristics according to the supply voltage thus set.

In this case, the voltage ratio of the multi-phase converter 5 is determined on the basis of the required voltage of the drive motor 2 and the output voltage from the DC/DC converter 8 for the battery 20 is linked to the output voltage from the multi-phase converter 5 (this becomes the DC link voltage). This ensures restraining the ripple current component generated from the fuel cell stack 6 without restricting the electric generation of the fuel cell stack 6.

The electric power adjustment system 1 according to this embodiment further includes the drive motor 2, the drive inverter 3, the motor rotation speed detector 21, and the motor torque detector 22. The drive motor 2 is used for a vehicle at least using the fuel cell stack 6 as the driving source and is the load that drives the vehicle. The drive inverter 3 is connected between the multi-phase converter 5 and the drive motor 2 and switching controls the electric power to the drive motor 2. The motor rotation speed detector 21 detects the motor rotation speed of the drive motor 2. The motor torque detector 22 detects the motor torque of the drive motor 2. Then, the ripple current characteristic switching unit 14 is configured to calculate the supply voltage of the drive inverter 3 with which the drive motor 2 is operatable on the basis of the motor rotation speed and the motor torque detected by the motor rotation speed detector 21 and the motor torque detector 22. Thus configuring the electric power adjustment system 1 ensures the calculation of the motor lower limit voltage of the drive motor 2 all the time (as necessary), thereby improving conversion efficiency of the multi-phase converter 5 on the basis of the motor lower limit voltage.

Furthermore, the electric power adjustment system 1 according to this embodiment further includes the impedance calculator 11, the wet/dry state estimator 13, and the impedance calculation request unit 12. The impedance calculator 11 calculates the impedance of the fuel cell stack 6 on the basis of the alternating-current component of the output current and the output voltage from the fuel cell stack 6 in response to the impedance calculation request for the fuel cell stack 6. The wet/dry state estimator 13 estimates the wet/dry state of the fuel cell stack 6 on the basis of the past impedance calculation value and the operating state of the fuel cell stack 6 in the operating state of the fuel cell stack 6 whose impedance of the fuel cell stack 6 is not calculated. The impedance calculation request unit 12 outputs the impedance calculation request for the fuel cell stack 6 when the power generation efficiency of the fuel cell stack 6 is determined to be lowered on the basis of the estimated value of the wet/dry state of the fuel cell stack 6. Thus configuring the electric power adjustment system 1 calculates the internal impedance again in the case where there is a possibility that the fuel cell stack 6 falls in the faulty state in generating power where the power generation efficiency of the fuel cell stack 6 is lowered when the wet/dry state of the fuel cell is estimated on the basis of the internal impedance of the fuel cell stack 6 calculated in the past and the power generation state of the fuel cell stack 6. Therefore, the operation of the drive motor 2 can be sufficiently controlled on the basis of the newly calculated internal impedance even in the state where the power generation efficiency of the fuel cell stack 6 is low.

(Second Embodiment)

The following describes a second embodiment of the present invention, mainly differences from the first embodiment. It should be noted that the overall configuration of the electric power adjustment system 1 is, since being similar, described by referring to FIG. 1, but a functional configuration of a fuel cell controller 10 is described by referring to FIG. 13.

In the above-described first embodiment, the number of drive phases of the multi-phase converter 5 is switched on the basis of the required voltage ratio of the multi-phase converter 5 and the DC link voltage is specified to any one of the output voltage from the fuel cell stack 6 or the motor lower limit voltage of the drive motor 2. In this embodiment, the generation of the ripple current component is optimally restrained by appropriately adjusting a required voltage value of the DC link voltage without switching the number of drive phases of the multi-phase converter 5.

Figure 13:
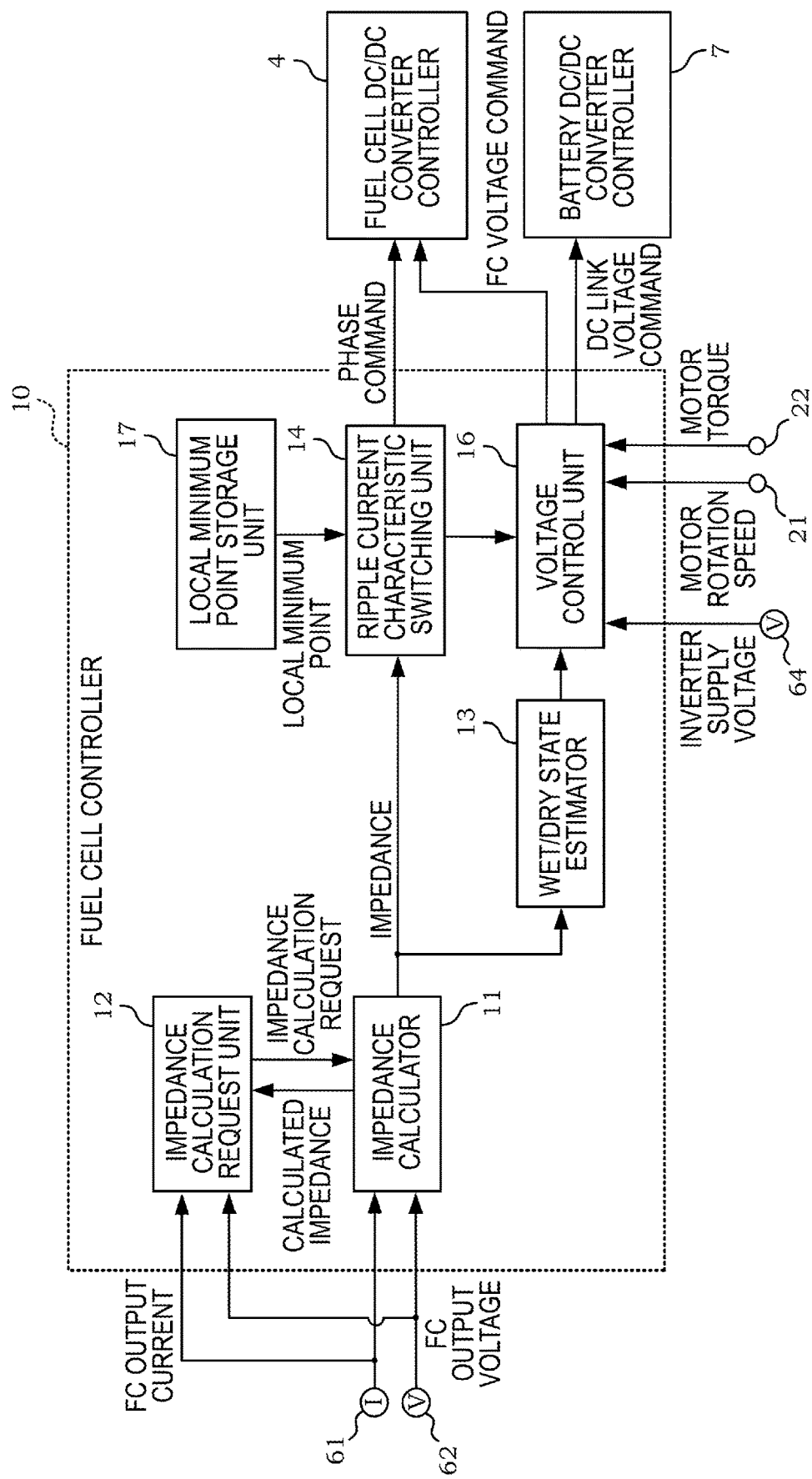
FIG. 13 is a block diagram illustrating a functional configuration of a fuel cell controller according to a second embodiment.

FIG. 13 is a block diagram illustrating the functional configuration of the fuel cell controller 10 according to the second embodiment of the present invention. For each portion illustrated in FIG. 13, ones having configurations similar to the first embodiment are attached with identical reference numerals and their detailed descriptions will not be further elaborated here.

Unlike the first embodiment, the fuel cell controller 10 according to this embodiment includes a local minimum point storage unit 17 instead of the ripple current characteristic storage unit 15. A function of the ripple current characteristic switching unit 14 is partially different. The following describes these differences in details.

Figure 16:
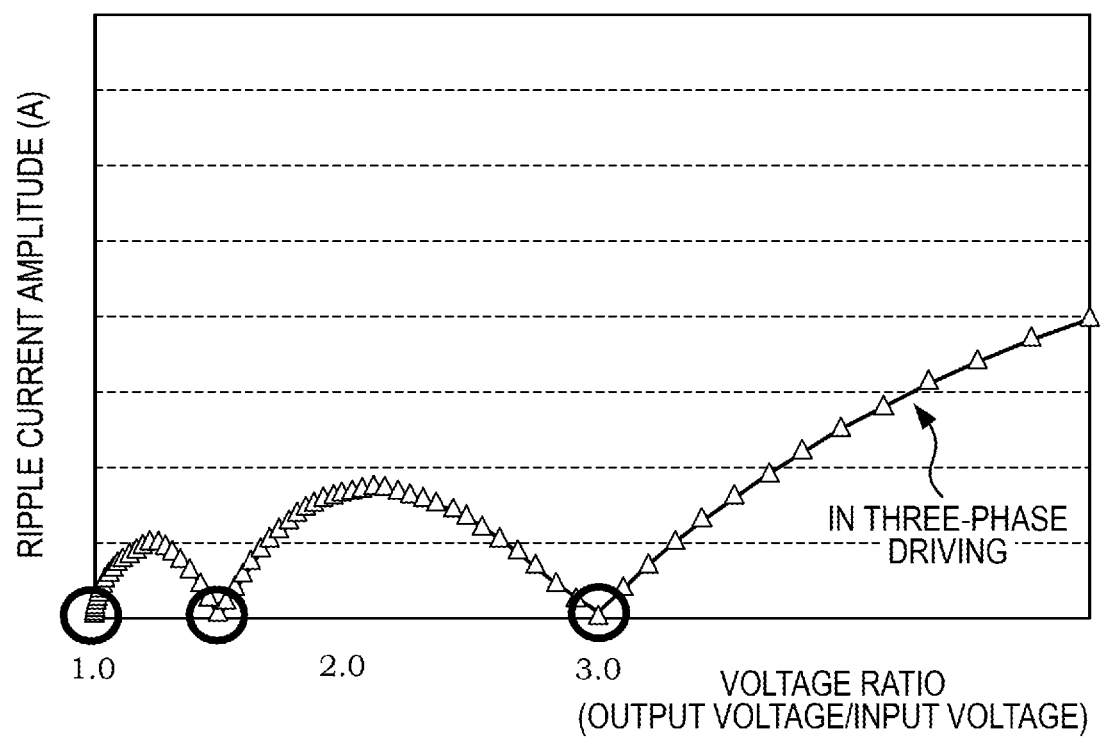
FIG. 16 is a graph illustrating a relationship between a voltage ratio of the fuel cell DC/DC converter and an amplitude of a ripple current generated in the fuel cell stack according to the second embodiment.

The local minimum point storage unit 17 is to store voltage ratios with which the amplitude (A) of the ripple current becomes local minimum in ripple current characteristic illustrated in FIG. 16. In this embodiment, the local minimum point storage unit 17 stores voltage ratios at local minimum points of the ripple current amplitude in the case where the multi-phase converter 5 performs the three-phase driving.

FIG. 16 is a graph indicating the relationship between the voltage ratio of the multi-phase converter 5 and the amplitude of the ripple current generated in the fuel cell stack 6 according to the second embodiment. As illustrated in FIG. 16, in the case where the multi-phase converter 5 performs three-phase driving, the ripple current amplitude becomes the local minimum when the voltage ratio is 1.5 and 3.0, as well as when the voltage ratio is 1.0 (that is, when no step up or step down occurs) (see circles in FIG. 16). This is because the input currents to the three converters are shifted by 120 degrees (=360 degrees/three phases) in the three-phase driving.

In this embodiment, since the multi-phase converter 5 is driven in three phases, the ripple current characteristic switching unit 14 outputs a phase command to shift by 120 degrees to the fuel cell DC/DC converter controller 4.

The ripple current characteristic switching unit 14 obtains information about the local minimum point stored in the local minimum point storage unit 17 as necessary when the voltage control unit 16 outputs the DC link voltage command to specify the DC link voltage. The ripple current characteristic switching unit 14 outputs the obtained local minimum point information to the voltage control unit 16.

In this embodiment, the voltage control unit 16 specifies and determines the DC link voltage to a predetermined voltage value on the basis of the output voltage from the fuel cell stack 6 and the motor lower limit voltage of the drive motor 2, and information about whether the impedance calculation request is output from the impedance calculation request unit 12 or not. A method for determining the DC link voltage will be described by referring to the flowchart in FIG. 14.

Next, an operation of the electric power adjustment system 1 according to the embodiment will be described. It should be noted that the overall control sequence of the electric power adjustment system 1 according to the first embodiment illustrated in FIG. 4 is also similar to this embodiment, thus the illustrations and descriptions are omitted. The following describes flowcharts different from those of the first embodiment in details among the flowcharts illustrating respective subroutines in FIG. 4.)

Figure 14:
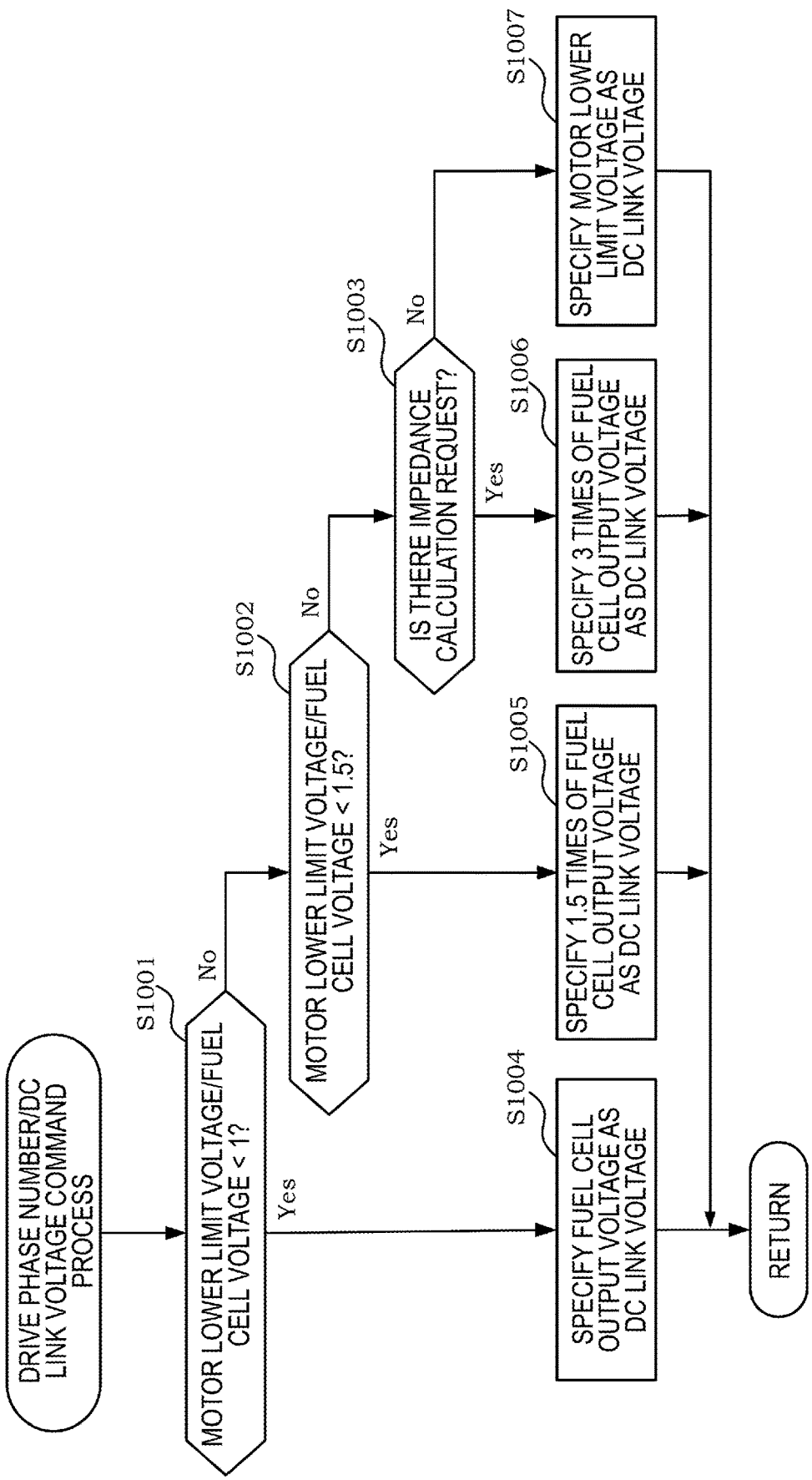
FIG. 14 is a flowchart illustrating a drive phase number/DC link voltage command process executed by the fuel cell controller according to the second embodiment.

FIG. 14 is a flowchart illustrating the number of drive phases and DC link voltage command executed by a fuel cell controller according to the second embodiment. In this embodiment, while the number of drive phases of the multi-phase converter 5 is not switched from three phases, here, its process name is referred to as "the drive phase number/DC link voltage command process" for convenience.

In this drive phase number/DC link voltage command process, firstly the fuel cell controller 10, on the basis of the motor lower limit voltage of the drive motor 2 determined by the motor lower limit voltage arithmetic process illustrated in FIG. 7 of the first embodiment and the output voltage value from the fuel cell stack 6 (hereinafter also referred to as a "fuel cell output voltage") detected by the voltage sensor 62, determines whether (the motor lower limit voltage)/(the fuel cell output voltage) is smaller than 1 or not (Step S1001).

Then, in the case where (the motor lower limit voltage)/(the fuel cell output voltage) is determined to be smaller than 1 at Step S1001, the voltage control unit 16 of the fuel cell controller 10 specifies the output voltage from the fuel cell stack 6 as the DC link voltage (Step S1004). Then, the fuel cell controller 10 terminates this drive phase number/DC link voltage command process.

On the other hand, in the case where (the motor lower limit voltage)/(the fuel cell output voltage) is determined to be larger than 1 at Step S1001, the fuel cell controller 10 determines whether (the motor lower limit voltage)/(the fuel cell output voltage) is smaller than 1.5 or not (Step S1002).

Then, in the case where (the motor lower limit voltage)/(the fuel cell output voltage) is determined to be smaller than 1.5, the voltage control unit 16 of the fuel cell controller 10 specifies 1.5 times the output voltage from the fuel cell stack 6 as the DC link voltage (Step S1005). Then, the fuel cell controller 10 terminates this drive phase number/DC link voltage command process.

On the other hand, in the case where (the motor lower limit voltage)/(the fuel cell output voltage) is determined to be larger than 1.5 at Step S1002, the fuel cell controller 10 determines whether there is an impedance calculation request output from the impedance calculation request unit 12 or not (Step S1003).

Then, in the case where it is determined that there is the impedance calculation request, the voltage control unit 16 of the fuel cell controller 10 specifies 3.0 times the output voltage from the fuel cell stack 6 as the DC link voltage (Step S1006). Then, the fuel cell controller 10 terminates this drive phase number/DC link voltage command process.

On the other hand, in the case where it is determined that there is no impedance calculation request, the voltage control unit 16 of the fuel cell controller 10 specifies the motor lower limit voltage of the drive motor 2 as the DC link voltage (Step S1007). Then, the fuel cell controller 10 terminates this drive phase number/DC link voltage command process.

Figure 15:
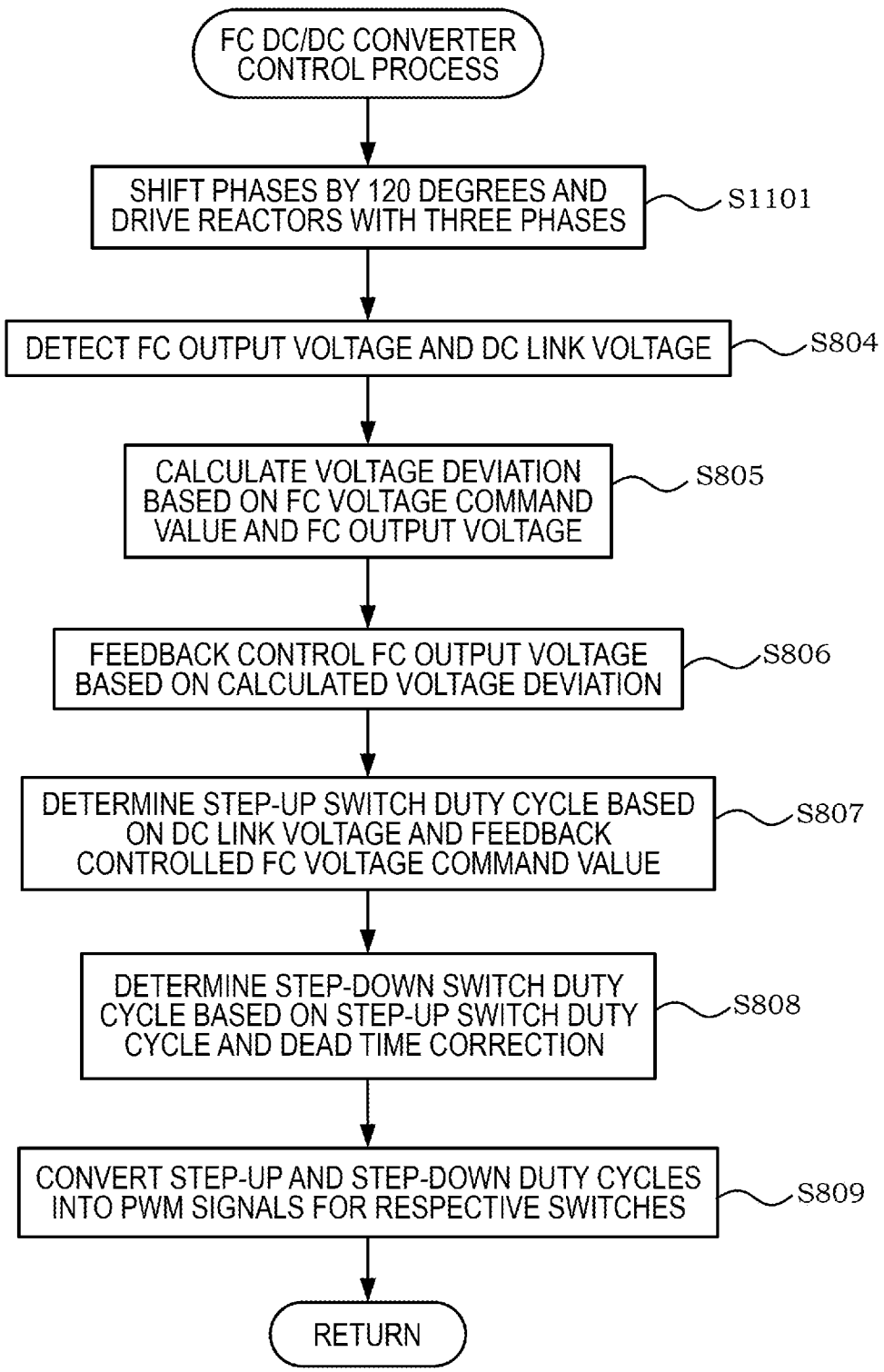
FIG. 15 is a flowchart illustrating an FC DC/DC converter control process executed by the fuel cell DC/DC converter controller according to the second embodiment.

FIG. 15 is a flowchart illustrating an FC DC/DC converter control process executed by the fuel cell DC/DC converter controller 4 according to the second embodiment. The FC DC/DC converter control process according to this embodiment illustrated in FIG. 15 is different from the FC DC/DC converter control process according to the first embodiment illustrated in FIG. 11 in that the number of drive phases of the multi-phase converter 5 is fixed to three. Therefore, steps similar to those of the flowchart in FIG. 11 are attached with identical step numbers and its detailed description will not be further elaborated here.

In this FC DC/DC converter control process, the fuel cell DC/DC converter controller 4 shifts the phases of the input currents to all phases of the multi-phase converter 5, that is, the three phases of converters by 120 degrees and drives those three phases of converters (Step S1101).

Then, the fuel cell DC/DC converter controller 4 executes the process similar to Steps S804 to S809 in the FC DC/DC converter control process according to the first embodiment illustrated in FIG. 11, and terminates this FC DC/DC converter control process.

As described above, the electric power adjustment system 1 according to this embodiment includes the fuel cell stack 6 and the multi-phase converter 5. The fuel cell stack 6 is connected to the drive motor 2, which is the load. The multi-phase converter 5 is connected between this fuel cell stack 6 and the drive motor 2, constituted of the plurality of phases (in this embodiment, three phases), and converts (steps up) the output voltage from the fuel cell stack 6 to the input voltage to the drive inverter 3 with a predetermined required voltage ratio. The electric power adjustment system 1 according to this embodiment includes the ripple current characteristic switching unit 14 that switches the ripple current characteristics with respect to the input current to the multi-phase converter 5 by changing the voltage ratio of the multi-phase converter 5 according to the operation state of the fuel cell stack 6 and the required electric power of the load. The electric power adjustment system 1 according to this embodiment includes the drive motor 2 and the drive inverter 3. The drive motor 2 is used for a vehicle at least using a fuel cell as the driving source and is the load that drives the vehicle. The drive inverter 3 is connected between the multi-phase converter 5 and the drive motor 2 and switching controls the electric power to the drive motor 2. The electric power adjustment system 1 according to this embodiment further includes the local minimum point storage unit 17 that stores one or more local minimum points where the ripple current becomes the local minimum in the relationship between the voltage ratio of the input and output of the multi-phase converter 5 and the ripple current. In the electric power adjustment system 1 according to this embodiment, the ripple current characteristic switching unit 14 is configured to specify the local minimum point higher than the voltage ratio between the motor lower limit voltage and the output voltage from the fuel cell stack 6 on the basis of the motor lower limit voltage, which is the lower limit value of the supply voltage to the drive inverter 3 determined from the operation state of the drive inverter 3 and the output voltage from the fuel cell stack 6 and control the multi-phase converter 5 so as to have the voltage ratio corresponding to the specified local minimum point.

Since the electric power adjustment system 1 according to this embodiment is thus configured, the voltage ratio of the multi-phase converter 5 is specified as the voltage ratio with which the amplitude of the ripple current component generated in the fuel cell stack 6 becomes the local minimal value. That is, in this embodiment, as illustrated in FIG. 16, setting the voltage ratio of the input and output of the multi-phase converter 5 to the voltage ratios of 1.5 and 3.0 at which the amplitude of the ripple current component becomes the local minimal value when the multi-phase converter 5 is driven with three phases ensures reducing this ripple current. This ensures effectively restraining the impedance detector (the impedance calculator 11) of the fuel cell stack 6 from being in a saturated state by simply disposing a smoothing condenser of minimum necessary without disposing an expensive smoothing condenser with a large capacity, similar to the first embodiment. Therefore, as necessary, the internal impedance of the fuel cell stack 6 is further accurately calculable.

According to the electric power adjustment system 1 of this embodiment, the increase of the ripple current component can be restrained similar to the first embodiment, thereby effectively reducing radio noise that is generated from the electric power adjustment system 1. This ensures preventing other devices in the electric power adjustment system 1 and other equipment disposed adjacent to the electric power adjustment system 1 from producing malfunctions.

It should be noted that, while in this embodiment, the case where the number of phases of the multi-phase converter 5 is three is described, the present invention is applicable not only to the multi-phase converter 5 constituted of three phases but also to a multi-phase converter constituted of three or more phases. In this case, the more the number of phases increases, the more the local minimum point increases, and there is an advantage that the drive motor 2 can be controlled with a further appropriate supply voltage. However, increasing the number of phases of the multi-phase converter increases the manufacturing cost of the entire electric power adjustment system 1. Accordingly, the number of phases of the multi-phase converter is simply deter mined by considering a performance of a rated current, a rated flow quantity and the like of the drive motor 2.

(Third Embodiment)

The following describes a third embodiment of the present invention, mainly differences from the first embodiment and the second embodiment. It should be noted that the overall configuration of the electric power adjustment system 1 is, since being similar, described by referring to FIG. 1, but a functional configuration of a fuel cell controller 10 is described by referring to FIG. 17.

In the above-described first embodiment, the number of drive phases of the multi-phase converter 5 is switched and the DC link voltage is specified as any one of the output voltage from the fuel cell stack 6 or the motor lower limit voltage of the drive motor 2. In the above-described second embodiment, the required voltage value of the DC link voltage is appropriately adjusted without switching the number of drive phases of the multi-phase converter 5. In this embodiment, a description will be given of the case where these two controls are simultaneously performed.

Figure 17:
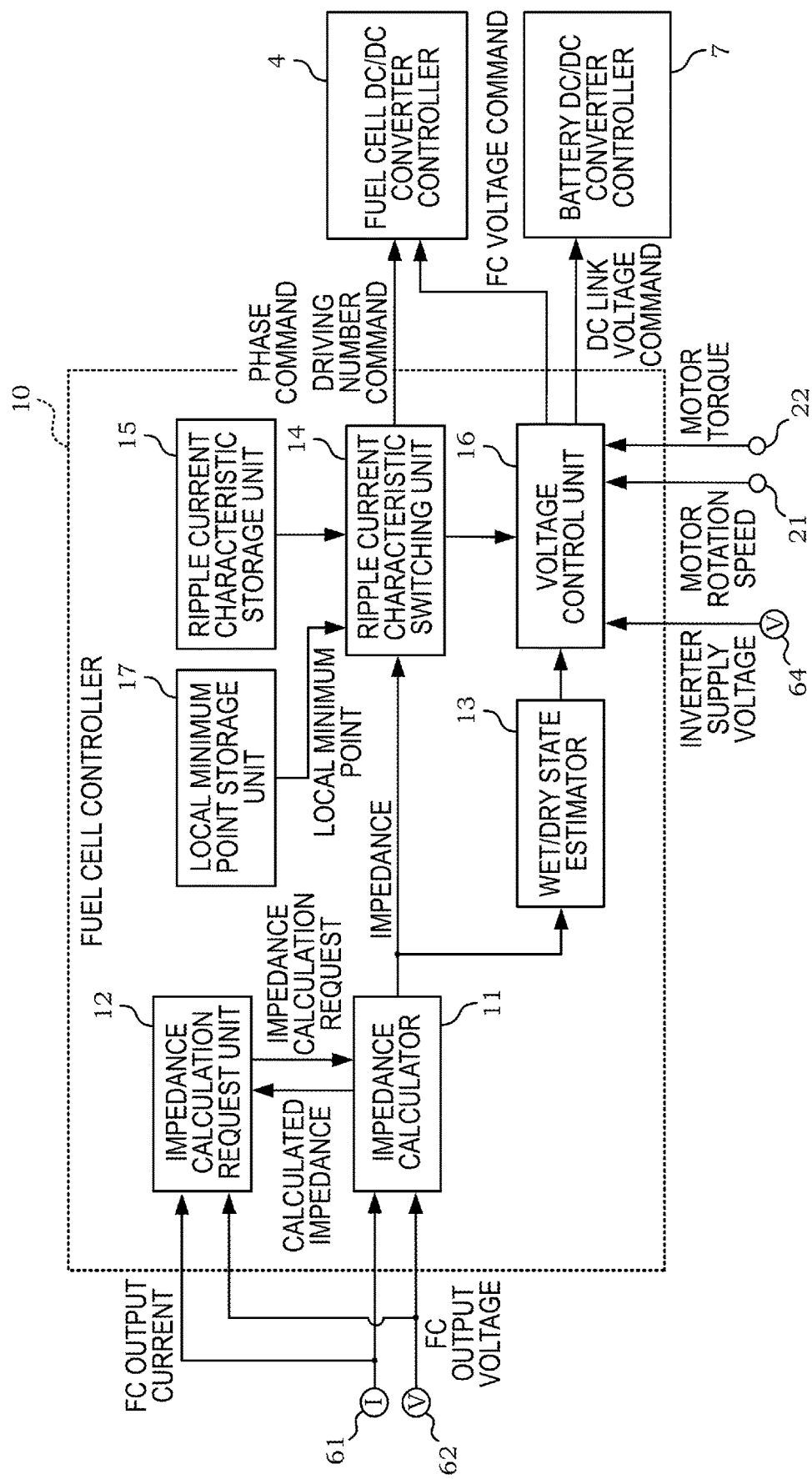
FIG. 17 is a block diagram illustrating a functional configuration of a fuel cell controller according to a third embodiment.

FIG. 17 is a block diagram illustrating the functional configuration of the fuel cell controller according to the third embodiment. For each portion illustrated in FIG. 17, ones having configurations similar to the first embodiment and the second embodiment are attached with identical reference numerals and their detailed descriptions will not be further elaborated here.

As illustrated in FIG. 17, the fuel cell controller 10 of this embodiment includes the ripple current characteristic storage unit 15 disposed in the first embodiment and the local minimum point storage unit 17 disposed in the second embodiment.

Figure 19:
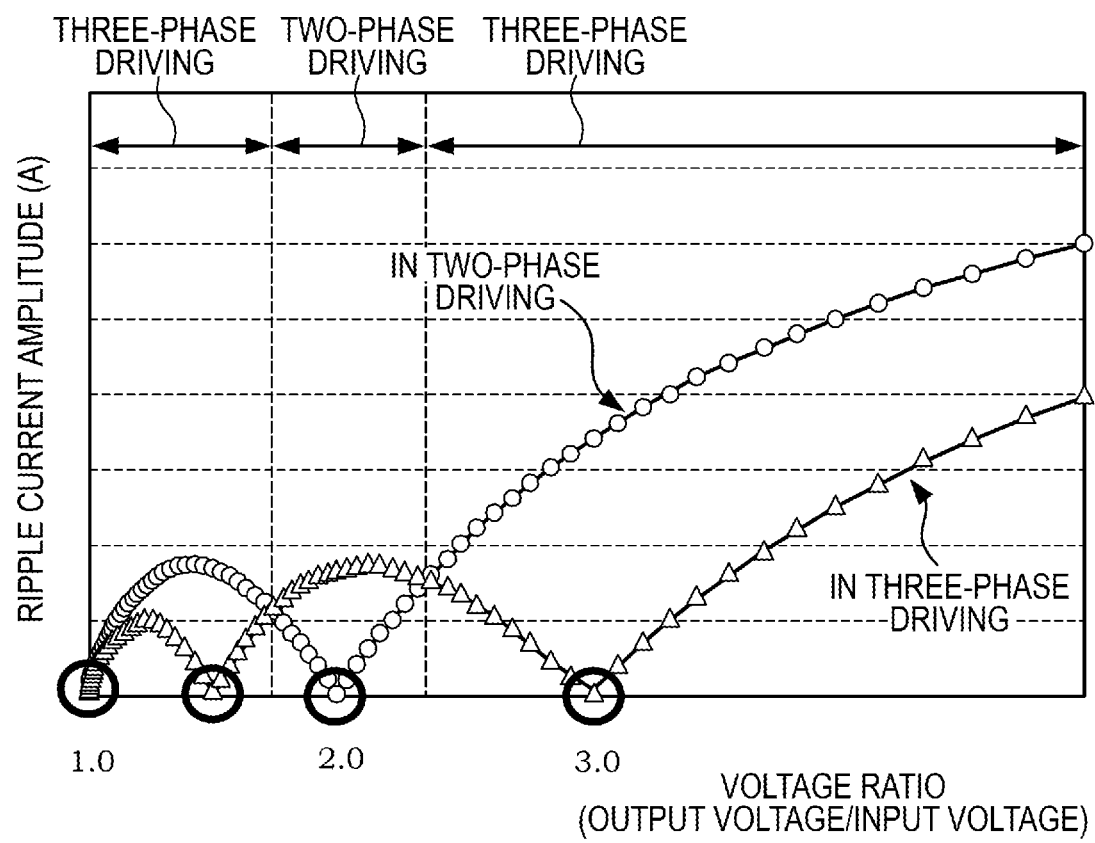
FIG. 19 is a graph illustrating a relationship between a voltage ratio of the fuel cell DC/DC converter and an amplitude of a ripple current generated in the fuel cell stack according to the third embodiment.

Unlike the second embodiment, the local minimum point storage unit 17 according to this embodiment stores local minimum points of ripple current characteristics in the two-phase driving of the multi-phase converter 5 in addition to local minimum points of ripple current characteristics in the three-phase driving of the multi-phase converter 5 in the ripple current characteristics illustrated in FIG. 19.

FIG. 19 is a graph indicating the relationship between the voltage ratio of the fuel cell DC/DC converter and the amplitude of the ripple current generated in the fuel cell according the third embodiment. As illustrated in FIG. 19, when the multi-phase converter 5 is in the three-phase driving, the ripple current amplitude becomes the local minimum when the voltage ratio is 1.5 and 3.0, as well as when the voltage ratio is 1.0 (that is, when no step up or step down occurs) (see circles in FIG. 19). On the other hand, when the multi-phase converter 5 is in the two-phase driving, the ripple current amplitude becomes the local minimum when the voltage ratio is 2.0, as well as when the voltage ratio is 1.0 (that is, when no step up or step down occurs) (see circles in FIG. 19). This is because the input currents to the multi-phase converter 5 are shifted in each driving according to the number of drive phases.

That is, in this embodiment, the voltage ratio of the multi-phase converter 5, which is required by the fuel cell controller 10, is determined on the basis of the comparison of the voltage ratio of the input and output of the multi-phase converter 5 with 1.5, 2.0, and 3.0. On the basis of the determined voltage ratio, the DC link voltage is specified.

Next, an operation of the electric power adjustment system 1 according to this embodiment will be described. It should be noted that the overall control sequence of the electric power adjustment system 1 according to the first embodiment illustrated in FIG. 4 is also similar to this embodiment, thus the illustrations and descriptions are omitted. The following describes flowcharts different from those of the first embodiment and the second embodiment in details among the flowcharts illustrating respective subroutines in FIG. 4.

Figure 18:
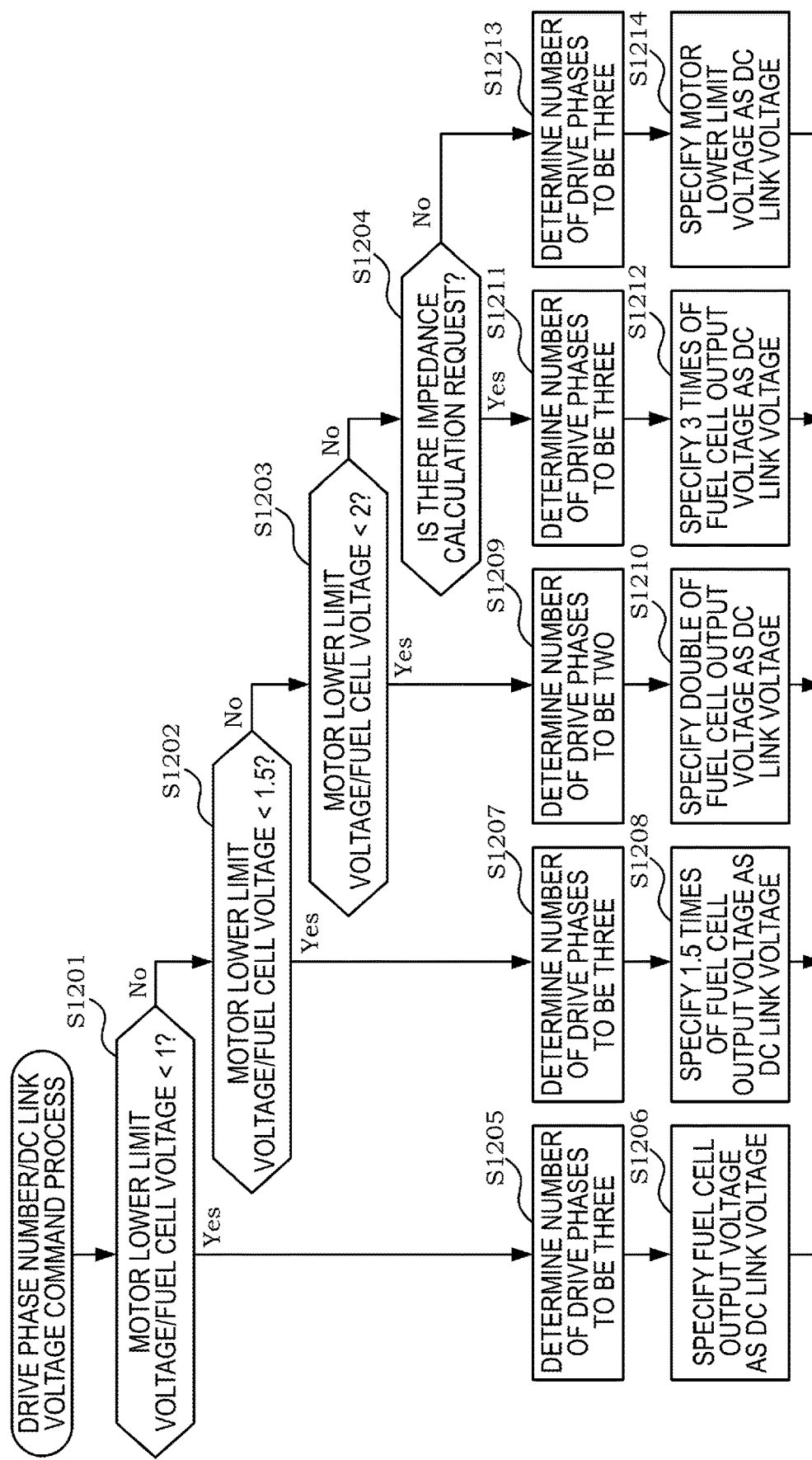
FIG. 18 is a flowchart illustrating a drive phase number/DC link voltage command process executed by the fuel cell controller according to the third embodiment.

FIG. 18 is a flowchart illustrating a drive phase number/DC link voltage command process executed by the fuel cell controller according to the third embodiment. In this embodiment, the number of drive phases of the multi-phase converter 5 and the DC link voltage are determined and specified on the basis of the motor lower limit voltage of the drive motor 2 and the output voltage from the fuel cell stack 6.

In this drive phase number/DC link voltage command process, on the basis of the motor lower limit voltage of the drive motor 2 determined by the motor lower limit voltage arithmetic process illustrated in FIG. 7 of the first embodiment and the output voltage value from the fuel cell stack 6 detected by the voltage sensor 62 (hereinafter also referred to as the "fuel cell output voltage"), the fuel cell controller 10 firstly determines whether (the motor lower limit voltage)/(the fuel cell output voltage) is smaller than 1 or not (Step S1201).

Then, in the case where it is determined that (the motor lower limit voltage)/(the fuel cell output voltage) is smaller than 1 at Step S1201, the ripple current characteristic switching unit 14 of the fuel cell controller 10 determines the number of drive phases of the multi-phase converter 5 to be three (Step S1205). Next, the voltage control unit 16 of the fuel cell controller 10 specifies the output voltage from the fuel cell stack 6 as the DC link voltage (Step S1206). Then, the fuel cell controller 10 terminates this drive phase number/DC link voltage command process.

On the other hand, in the case where it is determined that (the motor lower limit voltage)/(the fuel cell output voltage) is larger than 1 at Step S1201, the fuel cell controller 10 determines whether (the motor lower limit voltage)/(the fuel cell output voltage) is smaller than 1.5 or not (Step S1202).

Then, in the case where it is determined that (the motor lower limit voltage)/(the fuel cell output voltage) is smaller than 1.5, the ripple current characteristic switching unit 14 of the fuel cell controller 10 determines the number of drive phases of the multi-phase converter 5 to be three (Step S1207). Next, the voltage control unit 16 of the fuel cell controller 10 specifies 1.5 times the output voltage from the fuel cell stack 6 as the DC link voltage (Step S1208). Then, the fuel cell controller 10 terminates this drive phase number/DC link voltage command process.

On the other hand, in the case where it is determined that (the motor lower limit voltage)/(the fuel cell output voltage) is larger than 1.5 at Step S1202, the fuel cell controller 10 determines whether (the motor lower limit voltage)/(the fuel cell output voltage) is smaller than 2.0 or not (Step S1203).

Then, in the case where it is determined that (the motor lower limit voltage)/(the fuel cell output voltage) is smaller than 2.0, the ripple current characteristic switching unit 14 of the fuel cell controller 10 determines the number of drive phases of the multi-phase converter 5 to two (Step S1209). Next, the voltage control unit 16 of the fuel cell controller 10 specifies 2.0 times the output voltage from the fuel cell stack 6 as the DC link voltage (Step S1210). Then, the fuel cell controller 10 terminates this drive phase number/DC link voltage command process.

On the other hand, in the case where it is determined that (the motor lower limit voltage)/(the fuel cell output voltage) is larger than 2.0 at Step S1203, the fuel cell controller 10 determines whether there is an impedance calculation request output from the impedance calculation request unit 12 or not (Step S1204).

Then, in the case where it is determined that there is the impedance calculation request, the ripple current characteristic switching unit 14 of the fuel cell controller 10 determines the number of drive phases of the multi-phase converter 5 to be three (Step S1211). Next, the voltage control unit 16 of the fuel cell controller 10 specifies 3.0 times the output voltage from the fuel cell stack 6 as the DC link voltage (Step S1212). Then, the fuel cell controller 10 terminates this drive phase number/DC link voltage command process.

On the other hand, in the case where it is determined that there is no impedance calculation request, the ripple current characteristic switching unit 14 of the fuel cell controller 10 determines the number of drive phases of the multi-phase converter 5 to be three (Step S1211). Next, the voltage control unit 16 of the fuel cell controller 10 specifies the motor lower limit voltage of the drive motor 2 as the DC link voltage (Step S1212). Then, the fuel cell controller 10 terminates this drive phase number/DC link voltage command process.

As described above, the electric power adjustment system 1 according to this embodiment includes the fuel cell stack 6 and the multi-phase converter 5. The fuel cell stack 6 is connected to the drive motor 2, which is the load. The multi-phase converter 5 is connected between this fuel cell stack 6 and the drive motor 2, constituted of the plurality of phases (in this embodiment, three phases), and converts (steps up) the output voltage from the fuel cell stack 6 to the input voltage to the drive inverter 3 with the predetermined required voltage ratio. The electric power adjustment system 1 according to this embodiment includes the ripple current characteristic switching unit 14 that switches the ripple current characteristics with respect to the input current to the multi-phase converter 5 by changing the number of drive phases of the multi-phase converter 5 and its voltage ratio according to the operation state of the fuel cell stack 6 and the required electric power of the load. The electric power adjustment system 1 according to this embodiment further includes the ripple current characteristic storage unit 15 and the local minimum point storage unit 17. The ripple current characteristic storage unit 15 stores the ripple current characteristics that indicate the relationship between the voltage ratio of the input and output of the multi-phase converter 5 and the ripple current component according to the number of drive phases of the multi-phase converter 5. The local minimum point storage unit 17 stores one or more local minimum points where the ripple current becomes the local minimum in the relationship between the voltage ratio of the input and output of the multi-phase converter 5 and the ripple current. Then, the ripple current characteristic switching unit 14 is configured to specify the local minimum point higher than the voltage ratio between the motor lower limit voltage and the output voltage from the fuel cell on the basis of the motor lower limit voltage, which is the lower limit value of the supply voltage to the drive inverter 3 determined from the operation state of the drive inverter 3 and the output voltage from the fuel cell stack 6, and determine and specify the number of drive phases and the voltage ratio of the multi-phase converter 5 corresponding to the specified local minimum point.

Since the electric power adjustment system 1 according to this embodiment thus configured, an effect similar to the second embodiment can be provided. Furthermore, compared with the case of the second embodiment, the voltage ratio of 2.0, which is the local minimum point in the two-phase driving, is also added as a control target. Therefore, the electric power adjustment system 1 can control the fuel cell stack 6 and the battery 20 in further details. That is, in this embodiment, as illustrated in FIG. 19, the voltage ratio of the input and output of the multi-phase converter 5 is set to any one of the three local minimum points of the voltage ratios of 1.5 and 3.0 at which the amplitude of the ripple current component becomes the local minimal value when the multi-phase converter 5 is in the three-phase driving and the voltage ratio of 2.0 at which the amplitude of the ripple current component becomes the local minimal value when the multi-phase converter 5 is in the two-phase driving. Thus, this ripple current can be reduced.

The embodiments of the present invention described above are merely illustration of a part of application example of the present invention and not of the nature to limit the technical scope of the present invention to the specific constructions of the above embodiments.

In the above-described embodiments, while the number of phases of the multi-phase converter 5 is three, the present invention is not limited to this. For example, when the number of phases of the multi-phase converter 5 is five, the amplitude of the ripple current component becomes the local minimum when the voltage ratio of the multi-phase converter 5 is 2.5. Accordingly, the value of (the motor lower limit voltage)/(the fuel cell output voltage) can be determined in even more details in the flowchart illustrated in FIG. 18 of the third embodiment.

In the above-described embodiments, the description has been made using the electric power adjustment system 1 that includes the fuel cell stack 6 and the battery 20 connected to the drive motor 2, which is the load, in parallel as an example. However, since the generation of the ripple current is specific to the fuel cell stack 6, the present invention is applicable to an electric power adjustment system without the battery 20.

The invention claimed is:

1. An electric power adjustment system, comprising:
   a fuel cell connected to a load;
   a multi-phase converter connected between the fuel cell and the load, the multi-phase converter being constituted of a plurality of phases, the multi-phase converter converting an output voltage from the fuel cell by a predetermined required voltage ratio; and
   a ripple current characteristic switching unit configured to switch a ripple current characteristic with respect to an input current to the multi-phase converter so as to become a smallest ripple current by changing at least one of a drive phase number of the multi-phase converter or the voltage ratio of the multi-phase converter based on a relationship between the drive phase number of the multi-phase converter, the voltage ratio of the multi-phase converter, and a ripple current according to an operation state of the fuel cell and a required electric power of the load,
   wherein the ripple current has different smallest amplitudes for different drive phase numbers with respect to the voltage ratio.

2. The electric power adjustment system according to claim 1, wherein:
   the multi-phase converter has a phase number of three or more, and
   the ripple current characteristic switching unit is configured to switch the ripple current characteristics so as to reduce the ripple current with respect to the voltage ratio of the input and output voltages of the multi-phase converter by switching the drive phase number of the multi-phase converter on the basis of the output voltage from the fuel cell and a required voltage ratio of the multi-phase converter and shifting phases of the input voltages of respective phases on the basis of the drive phase number of the multi-phase converter.

3. The electric power adjustment system according to claim 2, further comprising
   a ripple current characteristic storage unit configured to store the ripple current characteristic indicating a relationship between the voltage ratio of the input and output voltages of the multi-phase converter and the ripple current according to the drive phase number of the multi-phase converter, wherein
   the ripple current characteristic switching unit is configured to determine which ripple current characteristic with respect to drive phase number of the multi-phase converter to be switched on the basis of the voltage ratio of the input and output voltages of the multi-phase converter and switches the drive phase number of the multi-phase converter according to the determination.

4. The electric power adjustment system according to claim 1, wherein
   the electric power adjustment system is to be used for a vehicle at least having the fuel cell as a driving source, and the electric power adjustment system further comprises:
   a drive motor serving as the load driving the vehicle;
   a drive inverter connected between the multi-phase converter and the drive motor, the drive inverter switch-controlling an electric power to the drive motor; and
   a local minimum point storage unit configured to store one or more local minimum points at which the ripple current becomes a local minimum in the relationship between the voltage ratio of the input and output of the multi-phase converter and the ripple current, wherein
   the ripple current characteristic switching unit, on the basis of a lower limit value of a supply voltage to the drive inverter determined from an operation state of the drive inverter and the output voltage from the fuel cell, specifies the local minimum point higher than a voltage ratio between the lower limit value and the output voltage from the fuel cell, and controls the multi-phase converter so as to have a voltage ratio corresponding to the specified local minimum point.

5. The electric power adjustment system according to claim 1, further comprising:
   a battery serving as an electric power supply different from the fuel cell; and
   a converter for battery, the converter being connected between the battery and the load, wherein
   the ripple current characteristic switching unit is configured to set a supply voltage supplied from the converter for battery to the load according to the output voltage from the fuel cell and switch the ripple current characteristic according to the set supply voltage.

6. The electric power adjustment system according to claim 1, wherein
   the electric power adjustment system is to be used for a vehicle at least having the fuel cell as a driving source, and the electric power adjustment system further comprises:
   a drive motor serving as the load driving the vehicle;
   a drive inverter connected between the multi-phase converter and the drive motor, the drive inverter switch-controlling an electric power to the drive motor; and
   a motor rotation speed detector configured to detect a rotation speed of the drive motor; and
   a motor torque detector configured to detect a torque of the drive motor, wherein
   the ripple current characteristic switching unit is configured to calculate a supply voltage of the drive inverter with which the drive motor can be operated on the basis of the motor rotation speed and the motor torque.

7. The electric power adjustment system according to claim 1, further comprising:
   an impedance calculator configured to calculate an impedance of the fuel cell on the basis of an alternating-current component of an output current and the output voltage from the fuel cell in response to an impedance calculation request of the fuel cell;

a wet/dry state estimator configured to, in an operating state of the fuel cell whose impedance of the fuel cell is not calculated, estimate a wet/dry state of the fuel cell on the basis of a past impedance calculation value and the operating state of the fuel cell; and an impedance calculation request unit configured to output an impedance calculation request of the fuel cell when a power generation efficiency of the fuel cell is determined to be lowered on the basis of an estimated value of the wet/dry state of the fuel cell.

8. A method for controlling an electric power adjustment system including a fuel cell connected to a load and a multi-phase converter connected between the fuel cell and the load, the multi-phase converter being constituted of a plurality of phases and converting an output voltage from the fuel cell, the method comprising:

changing at least one of a drive phase number of the multi-phase converter or a voltage ratio of input and output voltages of the multi-phase converter based on a relationship between the drive phase number of the multi-phase converter, the voltage ratio of the multi-phase converter, and a ripple current according to an operation state of the fuel cell and a required electric power from the load, wherein the ripple current has different smallest amplitudes for different drive phase numbers with respect to the voltage ratio; and switching a ripple current characteristic with respect to an input current to the multi-phase converter so as to become a smallest ripple current according to the operation state of the fuel cell.

9. An electric power adjustment system used for a vehicle at least having a fuel cell as a driving source, comprising:

a fuel cell connected to a load;

a multi-phase converter connected between the fuel cell and the load, the multi-phase converter being constituted of a plurality of phases, the multi-phase converter converting an output voltage from the fuel cell by a predetermined required voltage ratio;

a drive motor serving as the load driving the vehicle, a drive inverter connected between the multi-phase converter and the drive motor, the drive inverter switch-controlling an electric power to the drive motor;

a local minimum point storage unit configured to store one or more local minimum points at which a ripple current becomes a local minimum in a relationship between a voltage ratio of input and output voltages of the multi-phase converter and a ripple current; and a ripple current characteristic switching unit configured to switch a ripple current characteristic with respect to an input current to the multi-phase converter by changing at least one of a drive phase number or the voltage ratio of the multi-phase converter according to an operation state of the fuel cell and a required electric power of the load, wherein the ripple current characteristic switching unit, on the basis of a lower limit value of a supply voltage to the drive inverter determined from an operation state of the drive inverter and the output voltage from the fuel cell, specifies the local minimum point higher than a voltage ratio between the lower limit value and the output voltage from the fuel cell and controls the multi-phase converter so as to have a voltage ratio corresponding to the specified local minimum point.

10. The electric power adjustment system according to claim 9, wherein:

the multi-phase converter has a phase number of three or more, and the ripple current characteristic switching unit is configured to switch the ripple current characteristics so as to reduce the ripple current with respect to the voltage ratio of the input and output voltages of the multi-phase converter by switching the drive phase number of the multi-phase converter on the basis of the output voltage from the fuel cell and a required voltage ratio of the multi-phase converter and shifting phases of the input voltages of respective phases on the basis of the drive phase number of the multi-phase converter.

11. The electric power adjustment system according to claim 10, further comprising a ripple current characteristic storage unit configured to store the ripple current characteristic indicating a relationship between the voltage ratio of the input and output voltage of the multi-phase converter and the ripple current according to the drive phase number of the multi-phase converter, wherein the ripple current characteristic switching unit is configured to determine which ripple current characteristic with respect to drive phase number of the multi-phase converter to be switched on the basis of the voltage ratio of the input and output voltage of the multi-phase converter and switches the drive phase number of the multi-phase converter according to the determination.

* * * * *